US011343652B2

(12) United States Patent
Takeda et al.

(10) Patent No.: US 11,343,652 B2
(45) Date of Patent: May 24, 2022

(54) RESOURCE SELECTION FOR USER EQUIPMENT (UE)-SHARED MULTICAST FEEDBACK

(71) Applicant: QUALCOMM Incorporated, San Diego, CA (US)

(72) Inventors: Kazuki Takeda, Minato-Ku (JP); Le Liu, Fremont, CA (US); Alberto Rico Alvarino, San Diego, CA (US); Prasad Reddy Kadiri, San Diego, CA (US); Umesh Phuyal, San Diego, CA (US); Wanshi Chen, San Diego, CA (US); Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 128 days.

(21) Appl. No.: 16/730,642

(22) Filed: Dec. 30, 2019

(65) Prior Publication Data
US 2021/0204097 A1 Jul. 1, 2021

(51) Int. Cl.
*H04H 20/71* (2008.01)
*H04W 4/06* (2009.01)
(Continued)

(52) U.S. Cl.
CPC .......... *H04W 4/06* (2013.01); *H04W 72/042* (2013.01); *H04W 72/0413* (2013.01); *H04L 12/189* (2013.01)

(58) Field of Classification Search
None
See application file for complete search history.

(56) References Cited

U.S. PATENT DOCUMENTS

2017/0064706 A1 3/2017 Patel et al.
2017/0325277 A1 11/2017 Fujishiro et al.
(Continued)

FOREIGN PATENT DOCUMENTS

WO WO-2017035727 A1 3/2017
WO WO-2020068973 A1 4/2020

OTHER PUBLICATIONS

International Search Report and Written Opinion—PCT/US2020/066307—ISA/EPO—dated May 20, 2021.
(Continued)

*Primary Examiner* — Clemence S Han
(74) *Attorney, Agent, or Firm* — Holland & Hart LLP

(57) ABSTRACT

This disclosure provides methods, devices, and systems for resource selection supporting user equipment (UE)-shared multicast feedback. In some systems, a UE and a base station may support multicast communications. The base station may configure a set of physical uplink control channel (PUCCH) resources that the UE may use for multicast feedback messages. The base station may transmit an indication of the set of PUCCH resources to the UE, and the UE may determine to use a PUCCH resource of the set of PUCCH resources based on one or more indications from the base station. The UE may fail to receive a multicast message from the base station and may transmit a UE-shared negative acknowledgment (NACK) feedback message. The base station may re-transmit the multicast message according to a set of transmission parameters that is based on which PUCCH resource was used by one or more UEs for multicast NACK feedback.

28 Claims, 19 Drawing Sheets

(51) Int. Cl.
*H04W 72/04* (2009.01)
*H04L 12/18* (2006.01)

(56) References Cited

U.S. PATENT DOCUMENTS

| | | | | |
|---|---|---|---|---|
| 2019/0297618 | A1* | 9/2019 | Yang | H04L 5/0053 |
| 2019/0306923 | A1* | 10/2019 | Xiong | H04W 72/042 |
| 2020/0367244 | A1* | 11/2020 | Yang | H04W 72/02 |
| 2021/0051649 | A1* | 2/2021 | He | H04W 72/10 |
| 2021/0084622 | A1* | 3/2021 | Choi | H04W 72/12 |
| 2021/0194643 | A1* | 6/2021 | Parkvall | H04L 1/1854 |

OTHER PUBLICATIONS

Oppo: "PUCCH Resource Allocation for UL Feedback in MBMS", 3GPP Draft, 3GPP TSG RAN WG1 #102-e, R1-2006016, 3rd Generation Partnership Project (3GPP), Mobile Competence Centre, 650, Route Des Lucioles, F-06921 Sophia-Antipolis Cedex, France, vol. Ran WG1, No. e-Meeting, Aug. 17, 2020-Aug. 28, 2020, Aug. 7, 2020 (Aug. 7, 2020), XP051915132, 3 Pages, Retrieved from the Internet: URL: https://ftp.3gpp.org/tsg_ran/WG1_RL1/TSGR1_102-e/Docs/R1-2006016.zip. R1-2006016 OPPO-MBS-PUCCH resource.docx [retrieved on Aug. 7, 2020] the whole document.

Qualcomm Incorporated: "Multi-TRP Enhancements", 3GPP Draft, 3GPP TSG-RAN WG1 Meeting #99, R1-1912967, 3rd Generation Partnership Project (3GPP), Mobile Competence Centre, 650, Route Des Lucioles, F-06921 Sophia-Antipolis Cedex, France, vol. RAN WG1, No. Reno, Nevada, USA, Nov. 18, 2019-Nov. 22, 2019, Nov. 9, 2019 (Nov. 9, 2019), XP051823729, 21 pages, Retrieved from the Internet: URL: https://ftp.3gpp.org/tsg_ran/WG1_RL1/TSGR1_99/Docs/R1-1912967.zip, [retrieved on Nov. 9, 2019], p. 1-p. 7, tables 1-5, p. 1, line 25-line 33.

* cited by examiner

US 11,343,652 B2

RESOURCE SELECTION FOR USER EQUIPMENT (UE)-SHARED MULTICAST FEEDBACK

TECHNICAL FIELD

This disclosure relates generally to wireless communications, and more specifically, to resource selection for user equipment (UE)-shared multicast feedback.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a base station may perform a transmission that carries data intended for multiple UEs. Such a transmission may be referred to as a multicast transmission. A UE may transmit feedback to the base station based on whether the UE is able to successfully receive the transmission from the base station. In some cases, the UE may share resources for feedback transmissions with other UEs. For example, a number of UEs may share the same set of resources for feedback transmissions, such as negative acknowledgment (NACK) feedback transmissions. Accordingly, a base station may be unable to determine which of a set of UEs transmitted the feedback and, as such, may inefficiently retransmit the multicast messages. For example, the base station may be unable to optimize transmission parameters for particular UEs that failed to receive the multicast message, as the base station may not be able to determine which UE or UEs transmitted the NACK feedback in the shared set of resources.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method for wireless communications at a user equipment (UE). The method includes receiving an indication of a set of uplink control channel resources for reporting acknowledgment feedback by the UE for multicast communications, the set of uplink control channel resources shared by a set of UEs associated with the multicast communications; receiving a downlink control information (DCI) message including an uplink control channel resource indicator and scheduling a multicast message; determining an uplink control channel resource of the set of uplink control channel resources based on a set of communication conditions and the uplink control channel resource indicator; and transmitting a negative acknowledgment (NACK) feedback message for the multicast message on the determined uplink control channel resource.

Another innovative aspect of the subject matter described in this disclosure can be implemented in an apparatus for wireless communications at a UE. The apparatus includes a processor, memory coupled with the processor, and instructions stored in the memory. The instructions may be executable by the processor to cause the apparatus to receive an indication of a set of uplink control channel resources for reporting acknowledgment feedback by the UE for multicast communications, the set of uplink control channel resources shared by a set of UEs associated with the multicast communications; receive a DCI message including an uplink control channel resource indicator and scheduling a multicast message; determine an uplink control channel resource of the set of uplink control channel resources based on a set of communication conditions and the uplink control channel resource indicator; and transmit a NACK feedback message for the multicast message on the determined uplink control channel resource.

Another innovative aspect of the subject matter described in this disclosure can be implemented in another apparatus for wireless communications at a UE. The apparatus includes means for receiving an indication of a set of uplink control channel resources for reporting acknowledgment feedback by the UE for multicast communications, the set of uplink control channel resources shared by a set of UEs associated with the multicast communications; receiving a DCI message including an uplink control channel resource indicator and scheduling a multicast message; determining an uplink control channel resource of the set of uplink control channel resources based on a set of communication conditions and the uplink control channel resource indicator; and transmitting a NACK feedback message for the multicast message on the determined uplink control channel resource.

Another innovative aspect of the subject matter described in this disclosure can be implemented in a non-transitory computer-readable medium storing code for wireless communications at a UE. The code includes instructions executable by a processor to receive an indication of a set of uplink control channel resources for reporting acknowledgment feedback by the UE for multicast communications, the set of uplink control channel resources shared by a set of UEs associated with the multicast communications; receive a DCI message including an uplink control channel resource indicator and scheduling a multicast message; determine an uplink control channel resource of the set of uplink control channel resources based on a set of communication conditions and the uplink control channel resource indicator; and transmit a NACK feedback message for the multicast message on the determined uplink control channel resource.

In some implementations of the method, apparatuses, and non-transitory computer-readable medium, determining the uplink control channel resource includes determining a subset of uplink control channel resources of the set of uplink control channel resources based on the set of communication conditions and the uplink control channel resource indicator and selecting the uplink control channel resource from the subset of uplink control channel resources based on one or more of a random selection procedure, a UE identifier, or a radio network temporary identifier (RNTI).

In some implementations of the method, apparatuses, and non-transitory computer-readable medium, the set of UEs corresponds to a set of UE groups. In some implementations, the method, apparatuses, and non-transitory computer-readable medium may be configured to determine a UE group of the set of UE groups including the UE according to the set of communication conditions. In some examples, the uplink control channel resource indicator indicates the subset of uplink control channel resources for the UE group.

In some implementations of the method, apparatuses, and non-transitory computer-readable medium, the set of UEs corresponds to a set of UE groups. In some implementations, the method, apparatuses, and non-transitory computer-readable medium may be configured to determine multiple UE groups of the set of UE groups including the UE according to the set of communication conditions. In some examples, the uplink control channel resource indicator indicates the subset of uplink control channel resources for the multiple UE groups.

In some implementations of the method, apparatuses, and non-transitory computer-readable medium, the set of UEs corresponds to a set of UE groups. In some implementations of the method, apparatuses, and non-transitory computer-readable medium, determining the uplink control channel resource includes determining a UE group of the set of UE groups including the UE according to the set of communication conditions, the UE group corresponding to a subset of uplink control channel resources of the set of uplink control channel resources associated with respective uplink control channel resource indicator values, and determining the uplink control channel resource from the subset of uplink control channel resources according to the uplink control channel resource indicator.

In some implementations, the method, apparatuses, and non-transitory computer-readable medium may be configured to detect the DCI message in one or more control channel elements (CCEs) of a control resource set (CORESET). In some examples, the uplink channel resource may be determined further based on an index of a first CCE of the one or more CCEs.

In some implementations of the method, apparatuses, and non-transitory computer-readable medium, the uplink channel resource may be determined further based on a number of CCEs in the CORESET.

In some implementations of the method, apparatuses, and non-transitory computer-readable medium, the indication of the set of uplink control channel resources may include a first indication of a first set of uplink control channel resources. In some implementations, the method, apparatuses, and non-transitory computer-readable medium may be configured to receive a second indication of a second set of uplink control channel resources for reporting the acknowledgment feedback by the UE for the multicast communications, the second set of uplink control channel resources shared by the set of UEs associated with the multicast communications, determine to transmit the NACK feedback message in response to one or more multicast messages including the multicast message, and select the first set of uplink control channel resources for reporting the acknowledgment feedback for the multicast communications based on one or both of the one or more multicast messages or a number of multicast messages in the one or more multicast messages.

In some implementations of the method, apparatuses, and non-transitory computer-readable medium, the indication of the set of uplink control channel resources may be received in one or both of a radio resource control (RRC) message or a medium access control (MAC) control element (CE).

In some implementations of the method, apparatuses, and non-transitory computer-readable medium, the set of communication conditions includes one or more of a received signal strength indicator (RSSI), a reference signal received power (RSRP), a reference signal received quality (RSRQ), a signal to interference plus noise ratio (SINR), a channel quality indicator (CQI), a pre-coding matrix indicator (PMI), a path loss, a timing advance (TA), a power headroom, a measurement identified based on a synchronization signal block (SSB), a measurement identified based on a channel state information reference signal (CSI-RS), or a transmitter configuration identified based on a sounding reference signal (SRS).

One innovative aspect of the subject matter described in this disclosure can be implemented in a method for wireless communications at a base station. The method includes transmitting, over one or more multicast channels, an indication of a set of uplink control channel resources for reporting acknowledgment feedback for multicast communications, the set of uplink control channel resources shared by a set of UEs associated with the multicast communications; transmitting a DCI message including an uplink control channel resource indicator and scheduling a multicast message; transmitting, over the one or more multicast channels, the multicast message; receiving, from one or more UEs of the set of UEs, one or more NACK feedback messages for the multicast message on an uplink control channel resource of the set of uplink control channel resources shared by the one or more UEs; and re-transmitting, over the one or more multicast channels, the multicast message in response to the one or more NACK feedback messages using a set of transmission parameters based on the uplink control channel resource and the uplink control channel resource indicator.

Another innovative aspect of the subject matter described in this disclosure can be implemented in an apparatus for wireless communications at a base station. The apparatus includes a processor, memory coupled with the processor, and instructions stored in the memory. The instructions may be executable by the processor to cause the apparatus to transmit, over one or more multicast channels, an indication of a set of uplink control channel resources for reporting acknowledgment feedback for multicast communications, the set of uplink control channel resources shared by a set of UEs associated with the multicast communications; transmit a DCI message including an uplink control channel resource indicator and scheduling a multicast message; transmit, over the one or more multicast channels, the multicast message; receive, from one or more UEs of the set of UEs, one or more NACK feedback messages for the multicast message on an uplink control channel resource of the set of uplink control channel resources shared by the one or more UEs; and re-transmit, over the one or more multicast channels, the multicast message in response to the one or more NACK feedback messages using a set of transmission parameters based on the uplink control channel resource and the uplink control channel resource indicator.

Another innovative aspect of the subject matter described in this disclosure can be implemented in another apparatus for wireless communications at a base station. The apparatus includes means for transmitting, over one or more multicast channels, an indication of a set of uplink control channel resources for reporting acknowledgment feedback for multicast communications, the set of uplink control channel resources shared by a set of UEs associated with the multicast communications; transmitting a DCI message including an uplink control channel resource indicator and scheduling a multicast message; transmitting, over the one or more multicast channels, the multicast message; receiving, from one or more UEs of the set of UEs, one or more NACK feedback messages for the multicast message on an uplink control channel resource of the set of uplink control channel resources shared by the one or more UEs; and re-transmitting, over the one or more multicast channels, the multicast message in response to the one or more NACK feedback messages using a set of transmission parameters based on the uplink control channel resource and the uplink control channel resource indicator.

Another innovative aspect of the subject matter described in this disclosure can be implemented in a non-transitory computer-readable medium storing code for wireless communications at a base station. The code includes instructions executable by a processor to transmit, over one or more multicast channels, an indication of a set of uplink control channel resources for reporting acknowledgment feedback for multicast communications, the set of uplink control channel resources shared by a set of UEs associated with the multicast communications; transmit a DCI message including an uplink control channel resource indicator and scheduling a multicast message; transmit, over the one or more multicast channels, the multicast message; receive, from one or more UEs of the set of UEs, one or more NACK feedback messages for the multicast message on an uplink control channel resource of the set of uplink control channel resources shared by the one or more UEs; and re-transmit, over the one or more multicast channels, the multicast message in response to the one or more NACK feedback messages using a set of transmission parameters based on the uplink control channel resource and the uplink control channel resource indicator.

In some implementations of the method, apparatuses, and non-transitory computer-readable medium, the set of UEs corresponds to a set of UE groups. In some implementations, the method, apparatuses, and non-transitory computer-readable medium may be configured to determine a UE group of the set of UE groups including the one or more UEs according to the uplink control channel resource and the uplink control channel resource indicator and determine the set of transmission parameters based on the determined UE group.

In some implementations of the method, apparatuses, and non-transitory computer-readable medium, the DCI message may be transmitted in one or more CCEs of a CORESET. In some implementations, the method, apparatuses, and non-transitory computer-readable medium may be configured to determine the set of transmission parameters based on the uplink control channel resource, the uplink control channel resource indicator, and a first CCE of the one or more CCEs.

In some implementations of the method, apparatuses, and non-transitory computer-readable medium, the set of transmission parameters may be determined further based on a number of CCEs in the CORESET.

In some implementations, the method, apparatuses, and non-transitory computer-readable medium may be configured to determine one or more multicast messages for re-transmission based on the uplink control channel resource and the uplink control channel resource indicator, the one or more multicast messages for re-transmission including the multicast message.

In some implementations of the method, apparatuses, and non-transitory computer-readable medium, the indication of the set of uplink control channel resources may include a first indication of a first set of uplink control channel resources. In some implementations, the method, apparatuses, and non-transitory computer-readable medium may be configured to transmit, over the one or more multicast channels, a second indication of a second set of uplink control channel resources for reporting the acknowledgment feedback for the multicast communications, the second set of uplink control channel resources shared by the set of UEs associated with the multicast communications, and determine that the first set of uplink control channel resources includes the uplink control channel resource. In some examples, one or both of the one or more multicast messages for re-transmission or a number of multicast messages in the one or more multicast messages may be determined based on the determination that the first set of uplink control channel resources includes the uplink control channel resource.

In some implementations of the method, apparatuses, and non-transitory computer-readable medium, the indication of the set of uplink control channel resources may be transmitted in one or both of an RRC message or a MAC CE.

In some implementations of the method, apparatuses, and non-transitory computer-readable medium, the set of transmission parameters includes one or more of a modulation and coding scheme (MCS), a pre-coding matrix, or a transmission beam.

One innovative aspect of the subject matter described in this disclosure can be implemented in a method for wireless communications at a base station. The method includes determining, for a set of UEs, a first group of UEs and a second group of UEs different than the first group of UEs based on a set of communication conditions for each UE of the set of UEs; transmitting, over one or more multicast channels, a first indication of a first uplink control channel resource for reporting acknowledgment feedback for multicast communications, the first uplink control channel resource shared by the first group of UEs associated with the multicast communications; transmitting, over the one or more multicast channels, a second indication of a second uplink control channel resource for reporting acknowledgment feedback for the multicast communications, the second uplink control channel resource shared by the second group of UEs associated with the multicast communications; transmitting, over the one or more multicast channels, a multicast message; receiving, from one or more UEs, one or more NACK feedback messages for the multicast message on the first uplink control channel resource; and re-transmitting, over the one or more multicast channels, the multicast message in response to the one or more NACK feedback messages using a set of transmission parameters corresponding to the first group of UEs based on receiving the one or more NACK feedback messages on the first uplink control channel resource.

Another innovative aspect of the subject matter described in this disclosure can be implemented in an apparatus for wireless communications at a base station. The apparatus includes a processor, memory coupled with the processor, and instructions stored in the memory. The instructions may be executable by the processor to cause the apparatus to determine, for a set of UEs, a first group of UEs and a second group of UEs different than the first group of UEs based on a set of communication conditions for each UE of the set of UEs; transmit, over one or more multicast channels, a first indication of a first uplink control channel resource for reporting acknowledgment feedback for multicast communications, the first uplink control channel resource shared by the first group of UEs associated with the multicast communications; transmit, over the one or more multicast channels, a second indication of a second uplink control channel resource for reporting acknowledgment feedback for the multicast communications, the second uplink control channel resource shared by the second group of UEs associated with the multicast communications; transmit, over the one or more multicast channels, a multicast message; receive, from one or more UEs, one or more NACK feedback messages for the multicast message on the first uplink control channel resource; and re-transmit, over the one or more multicast channels, the multicast message in response to the one or more NACK feedback messages using a set of transmission parameters corresponding to the first group of UEs based on receiving the one or more NACK feedback messages on the first uplink control channel resource.

Another innovative aspect of the subject matter described in this disclosure can be implemented in another apparatus for wireless communications at a base station. The apparatus includes means for determining, for a set of UEs, a first group of UEs and a second group of UEs different than the first group of UEs based on a set of communication conditions for each UE of the set of UEs; transmitting, over one or more multicast channels, a first indication of a first uplink control channel resource for reporting acknowledgment feedback for multicast communications, the first uplink control channel resource shared by the first group of UEs associated with the multicast communications; transmitting, over the one or more multicast channels, a second indication of a second uplink control channel resource for reporting acknowledgment feedback for the multicast communications, the second uplink control channel resource shared by the second group of UEs associated with the multicast communications; transmitting, over the one or more multicast channels, a multicast message; receiving, from one or more UEs, one or more NACK feedback messages for the multicast message on the first uplink control channel resource; and re-transmitting, over the one or more multicast channels, the multicast message in response to the one or more NACK feedback messages using a set of transmission parameters corresponding to the first group of UEs based on receiving the one or more NACK feedback messages on the first uplink control channel resource.

Another innovative aspect of the subject matter described in this disclosure can be implemented in a non-transitory computer-readable medium storing code for wireless communications at a base station. The code includes instructions executable by a processor to determine, for a set of UEs, a first group of UEs and a second group of UEs different than the first group of UEs based on a set of communication conditions for each UE of the set of UEs; transmit, over one or more multicast channels, a first indication of a first uplink control channel resource for reporting acknowledgment feedback for multicast communications, the first uplink control channel resource shared by the first group of UEs associated with the multicast communications; transmit, over the one or more multicast channels, a second indication of a second uplink control channel resource for reporting acknowledgment feedback for the multicast communications, the second uplink control channel resource shared by the second group of UEs associated with the multicast communications; transmit, over the one or more multicast channels, a multicast message; receive, from one or more UEs, one or more NACK feedback messages for the multicast message on the first uplink control channel resource; and re-transmit, over the one or more multicast channels, the multicast message in response to the one or more NACK feedback messages using a set of transmission parameters corresponding to the first group of UEs based on receiving the one or more NACK feedback messages on the first uplink control channel resource.

In some implementations of the method, apparatuses, and non-transitory computer-readable medium, the first indication indicates a first set of uplink control channel resources including the first uplink control channel resource, and the second indication indicates a second set of uplink control channel resources including the second uplink control channel resource.

In some implementations, the method, apparatuses, and non-transitory computer-readable medium may be configured to transmit a DCI message including an uplink control channel resource indicator and scheduling the multicast message and determining that the one or more UEs correspond to the first group of UEs based on the uplink control channel resource indicator and receiving the one or more NACK feedback messages on the first uplink control channel resource.

In some implementations of the method, apparatuses, and non-transitory computer-readable medium, one or both of the first indication of the first uplink control channel resource or the second indication of the second uplink control channel resource may be transmitted in one or both of an RRC message or a MAC CE.

In some implementations of the method, apparatuses, and non-transitory computer-readable medium, the set of communication conditions includes one or more of an RSSI, an RSRP, an RSRQ, an SINR, a CQI, a PMI, a path loss, a TA, a power headroom, a measurement identified based on an SSB, a measurement identified based on a CSI-RS, or a transmitter configuration identified based on an SRS.

In some implementations of the method, apparatuses, and non-transitory computer-readable medium, the set of transmission parameters includes one or more of an MCS, a pre-coding matrix, or a transmission beam.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

Like reference numbers and designations in the various drawings indicate like elements.

DETAILED DESCRIPTION

Figure 1:
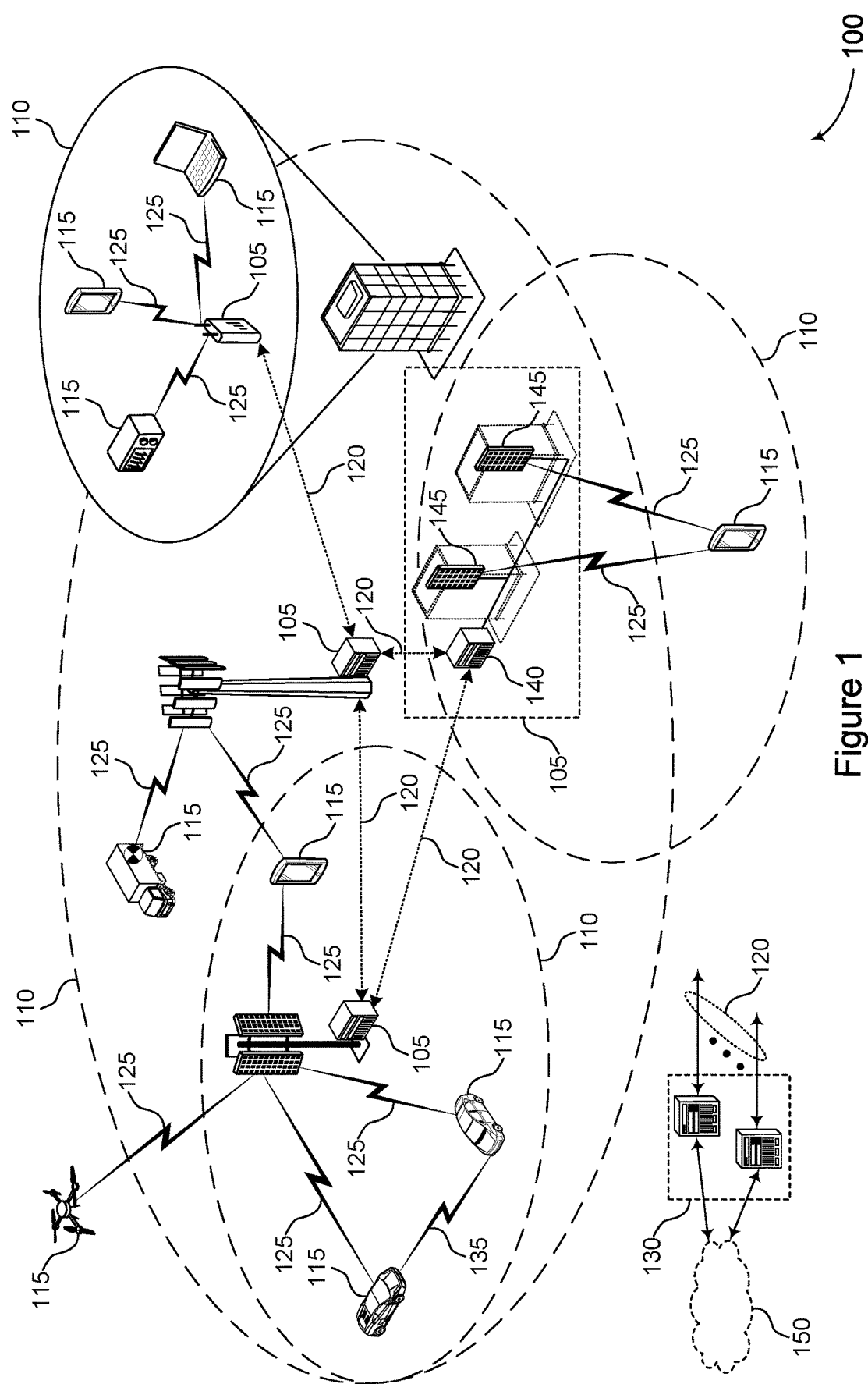
FIGS. 1 and 2 illustrate examples of wireless communications systems that support resource selection for user equipment (UE)-shared multicast feedback in accordance with aspects of the present disclosure.

The following description is directed to particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G, or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO), and multi-user (MU) MIMO.

Various implementations relate generally to resource selection by a user equipment (UE) for UE-shared negative acknowledgment (NACK) feedback to multicast transmissions. Some implementations more specifically relate to grouping UEs for UE-shared NACK feedback, such that a base station may identify a group of UEs failing to receive a multicast message and may select transmission parameters for re-transmission of the multicast message to the identified group. In some implementations, each UE may identify its own UE group based on one or more conditions, such as channel quality conditions, modulation order conditions, communication beam conditions, or any other relevant conditions. A base station may configure a set of resources, such as physical uplink control channel (PUCCH) resources, for a UE to use to transmit UE-shared NACK feedback to the base station, and the UE may select a PUCCH resource from the configured set of resources based on a downlink control information (DCI) indication—such as a PUCCH resource indicator (PRI)—and the identified UE group. In some implementations, the UE may select the PUCCH resource for UE-shared NACK feedback further based on a control channel element (CCE) index in which the DCI message is detected. Additionally or alternatively, the UE may select between multiple PUCCH resource sets to provide feedback information to a base station for multiple multicast messages. In some other implementations, the base station may group the UEs and provide different PUCCH resource sets to the different UE groups. The base station receiving UE-shared NACK feedback for a multicast message may determine to which UE group the NACK feedback corresponds (for example, based on the PUCCH resource or resources in which the feedback is received) and may update a set of transmission parameters for a re-transmission of the multicast message to improve the likelihood that a particular group of UEs (for example, the determined UE group) may successfully receive the re-transmission of the multicast message.

Particular implementations of the subject matter described in this disclosure can be implemented to realize one or more of the following potential advantages. In some implementations, the described techniques can be used to improve the likelihood of successful reception of a multicast transmission with relatively low system overhead. For example, UEs may share resources for NACK feedback, reducing the resource overhead involved in multicast feedback (for example, as compared to UE-specific multicast feedback). However, by supporting multiple UE groups for UE-shared NACK feedback, a base station may adaptively update a set of transmission parameters for a re-transmission of a multicast message based on which UE, or UEs, failed to successfully receive a multicast message. This may increase the likelihood that a UE successfully receives a re-transmission of the multicast message, improving system efficiency (for example, reducing channel overhead and signaling latency) by potentially reducing the number re-transmissions the base station performs in order for the target UEs to successfully receive the multicast message. Furthermore, by reducing the number of re-transmissions, the base station and the UEs may additionally experience increased power savings associated with fewer message transmissions, monitoring occasions, and decoding processes. In some implementations, UEs may determine PUCCH resources to use for transmitting UE-shared NACK feedback based on mutually understood rules between the UEs and the base station. This may enable a UE to select a PUCCH resource with low signaling overhead between the UE and base station, while still enabling the base station to determine which PUCCH resource or resources correspond to which group of UEs.

FIG. 1 illustrates an example of a wireless communication system 100 that supports resource selection for UE-shared multicast feedback in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, and the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds. In some examples $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications system 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communication system 100 and may be referred to as a transmission time interval (TTI). In some examples, the TTI duration (for example, the number of symbol periods in a TTI) may be variable. Additionally or alternatively, the smallest scheduling unit of the wireless communication system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In some other examples, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARD) feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback and the device may provide HARQ feedback in a specific slot for data received in a previous symbol in the slot. In some other examples, the device may provide HARQ feedback in a subsequent slot, or according to some other time interval.

In some implementations of the present disclosure, a base station 105 may configure a set of PUCCH resources for a number of UEs 115 to share for multicast feedback. The base station 105 may transmit an indication of the set of PUCCH resources that may be used for multicast feedback to the UEs 115. In some examples, the base station 105 may transmit the indication of the set of PUCCH resources via higher layer signaling, such as in RRC signaling or in a MAC control element (MAC CE). The base station 105 may further configure the set of PUCCH resources such that a subset of the set of PUCCH resources may be associated with a UE 115 or a group of UEs 115 associated with similar conditions. For example, a group of UEs 115 may feature similar link conditions based on a similar geographic location, a similar distance from the base station 105, or some other similarities. The group of UEs may be allocated, based on a group identity, a subset of the set of PUCCH resources indicated by the base station 105.

In some examples, a UE 115 may determine which PUCCH resource to use for a feedback message based on an indication from the base station 105, a condition of the UE 115, or both. In some aspects, the base station 105 may provide an indication for which PUCCH resource a UE 115 may use for feedback. For example, the base station 105 may transmit a DCI message to a number of UEs 115 to schedule a multicast message. In some implementations, the base station 105 may include a PRI field in the DCI. A UE 115 may receive the DCI and may identify a PRI value within the PM field. In some examples, the PM value may correspond to a subset of the set of PUCCH resources. Additionally or alternatively, the UE 115 may use other aspects of the DCI, such as one or more CCE indices associated with the DCI, a configuration of a CORESET (for example, a CORESET identifier (ID) or a resource block index for a resource block in which the CORESET is mapped, among other examples) in which the DCI message is received, or both to determine a PUCCH resource.

Additionally or alternatively, the UE 115 may identify a set of communication conditions associated with the communications between the base station 105 and the UE 115, such as a reference signal received power (RSRP), a reference signal received quality (RSRQ), a signal to interference plus noise ratio (SINR), a received signal strength indicator (RSSI), a channel quality indicator (CQI), a PMI, a path loss, a timing advance (TA), a power headroom, or a combination thereof. In some examples, the set of communication conditions may be measured or estimated by receiving a synchronization signal block (SSB), by receiving a CSI-RS, by transmitting a sounding reference signal (SRS), or a combination thereof. In some aspects, the communication conditions of the UE 115 may be associated with a group of UEs 115, and the UE 115 may use the identified communication conditions to determine to which group of UEs 115 the UE 115 belongs. For example, each UE 115 within a group of UEs 115 may be associated with similar communication conditions. Additionally or alternatively, the base station 105 may transmit an indication to the UE 115 indicating to which group of UEs 115 the UE 115 belongs.

In some implementations, the UE 115 may use the determined group of UEs 115 to which the UE 115 belongs—along with the received PRI value—to determine a PUCCH resource from the set of PUCCH resources. In some examples, the configured set of PUCCH resources may be illustrated in a table or grid format such that the PRI value and the group of UEs 115 may correspond to two indices of the table (for example, the table of the set of PUCCH resources may be an N×M table for N UE groups and M PRI values). As such, a UE 115 may use the PM value and the UE group information to determine which PUCCH resource from the set of PUCCH resources to use for multicast feedback.

The UE 115 may monitor for a multicast message according to the scheduling information included in the DCI. In some examples, the UE 115 may fail to successfully receive a multicast message and may transmit a NACK feedback message to the base station 105 to inform the base station 105 that the multicast message was not successfully received. Based on the configuration of the PUCCH resources, the base station 105 may be aware of which PUCCH resource(s) corresponds to which combination of PM value and UE 115 group. For example, the base station 105 may receive a NACK feedback message on a PUCCH resource and may determine which UE 115 group corresponds to the received PUCCH resource (for example, based on the PRI value transmitted by the base station 105). Accordingly, the base station 105 may determine which UE 115, or which group of UEs 115, failed to successfully receive the multicast message based on the PUCCH resource on which UE-shared NACK feedback is received. To improve system reliability and increase the likelihood of successful reception of the re-transmission of the multicast message by the UE 115, or group of UEs 115, that failed to successfully receive the multicast message, the base station 105 may use a set of transmission parameters based on the determined UE 115 or group of UEs 115. For example, the base station 105 may update one or more of a modulation and coding scheme (MCS), a transmit beam, a transmit power, a pre-coding matrix, or a combination thereof to re-transmit the multicast message based on the communication conditions associated with the determined group of UEs 115.

Figure 2:
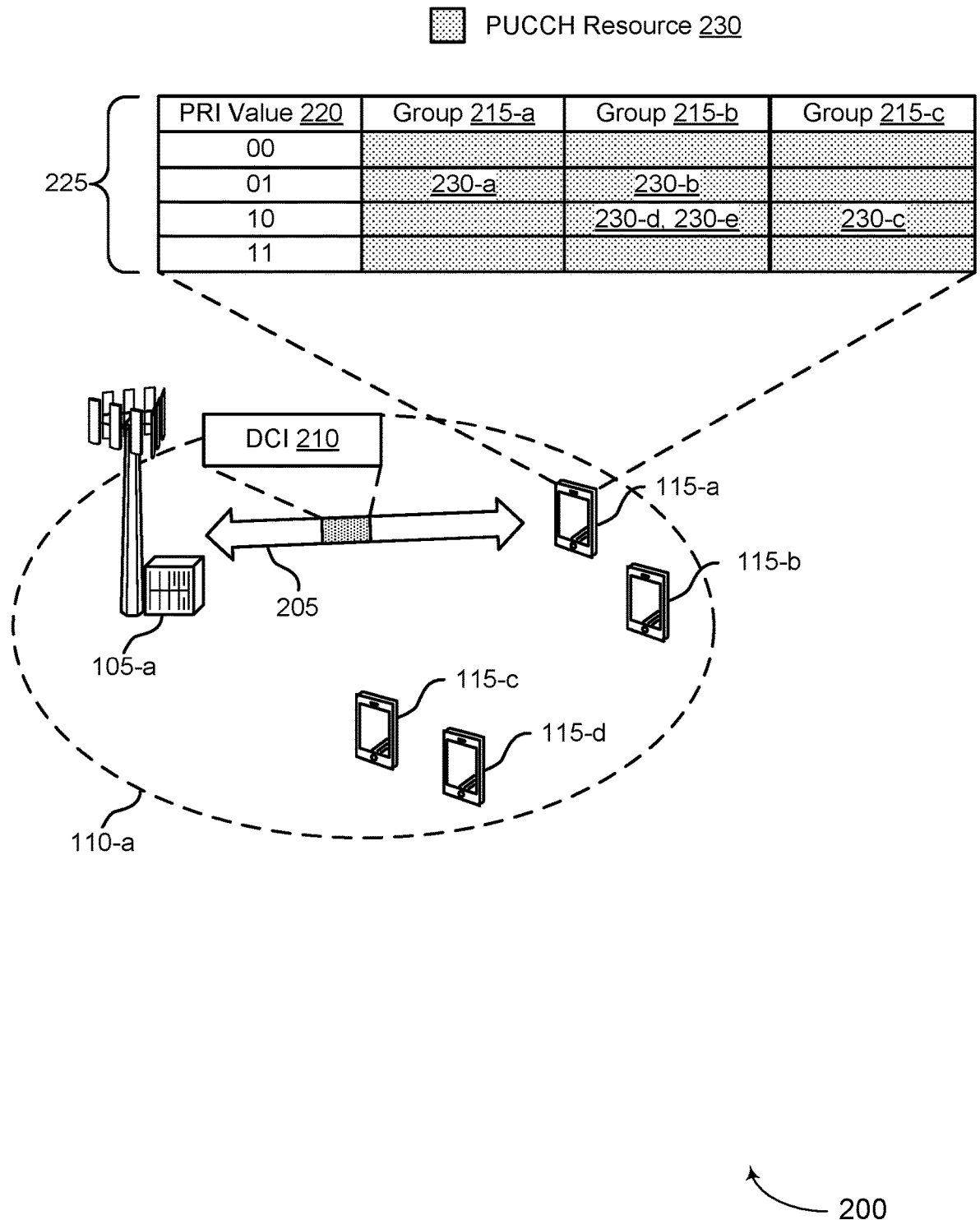

FIG. 2 illustrates an example of a wireless communications system 200 that supports resource selection for UE-shared multicast feedback in accordance with aspects of the present disclosure. In some examples, the wireless communications system 200 may implement aspects of a wireless communications system 100. The wireless communications system 200 may include multiple UEs 115 and a base station 105-a, which may be examples of the corresponding wireless devices described with respect to FIG. 1. The base station 105-a may provide network coverage for a coverage area 110-a. In some examples, the wireless communications system 200 may be configured to support grouping of UE-shared NACK feedback for multicast messages.

For example, a base station 105-a may perform a single transmission carrying data that is intended for multiple UEs 115, such as a UE 115-a, a UE 115-b, a UE 115-c, and a UE 115-d. Such a transmission may be referred to as a multicast transmission. The base station 105-a may transmit a multicast message that reaches (or is detectable) across a coverage area 110-a. That is, the multicast message may be received by any UE 115 within the coverage area 110-a that is monitoring the multicast channel. In some implementations, the UEs 115 receiving the multicast message may be distributed throughout the coverage area 110-a and implicitly arranged into groups (for example, according to multicast channel conditions at each UE 115). For example, the UEs 115 may be implicitly arranged into groups based on clusters of UEs 115 located in different regions of the coverage area 110-a. In some aspects, the UE 115-a and the UE 115-b may be implicitly arranged into a first group based on being located in a similar geographic area, being located a similar distance from the base station 105-a, having similar channel quality conditions, or some combination thereof. The UE 115-c and the UE 115-d may be implicitly arranged into a second group for similar reasons. In some examples, one or more UEs 115 may fail to receive a multicast message while other UEs 115 may successfully receive the multicast message. For example, UEs 115 may fail to successfully receive or decode the multicast message due to localized interference on a channel between the base station 105-a and the UEs 115.

In some modes of operation (for example, unicast modes of operation or multicast modes of operation), a base station 105-a may configure each UE 115 with a UE-specific PUCCH resource 230 for positive acknowledgment (ACK)/NACK feedback. In some other modes of operation, a base station 105-a may support UE-shared NACK feedback for multicast transmissions, and the base station 105-a may not configure each UE 115 with a UE-specific PUCCH resource 230 for ACK/NACK feedback. UE-shared NACK feedback may be associated with less signaling overhead than UE-specific ACK/NACK feedback, because each UE 115 does not transmit feedback—either positive or negative—in a separate PUCCH resource 230. However, when supporting UE-shared NACK feedback, the base station 105-a may be unaware of which UEs 115 fail to receive a multicast message, as the NACK messages for multiple UEs 115 are received in a same PUCCH resource 230. Based on this inability to differentiate between UEs 115 sending NACK feedback, the base station 105-a may not be able to adaptively re-transmit the multicast message for the UEs 115 that failed to receive the message. Additionally, for similar reasons, a base station 105-a that configures UE-shared NACK resources may be unable to switch from a multicast transmission to one or more unicast transmissions directed to UEs 115 that failed to receive the multicast message, and the base station 105-a and UEs 115 may maintain separate HARQ-ACK codebooks for multicast and unicast feedback. In some examples, the base station 105-a may experience unpredictable over-the-air (OTA) combining of NACK feedback (for example, based on multiple UEs 115 sharing the same PUCCH resource 230 for NACK feedback).

During multicast communications employing a UE-shared NACK feedback resource configuration, a base station 105-a may not be provided with, or may be unable to determine, information related to which specific UEs 115 have failed to receive a multicast message. For example, the base station 105-a may detect that a NACK is received from a UE 115, but if the UE 115-a, the UE 115-b, the UE 115-c, and the UE 115-d all share a PUCCH resource 230 for UE-shared NACK feedback, the base station 105-a may fail to determine which UE 115 or UEs 115 transmitted the NACK. Without such UE-specific information, the base station 105-a may not support UE-specific transmission, or re-transmission, techniques during multicast communications. For example, the base station 105-a may be unaware of the specific communication conditions for the one or more UEs 115 that transmit the UE-shared NACK, potentially resulting in inefficient re-transmission techniques.

In some examples, the inability of the base station 105-a to determine a location of the UEs 115 that are failing to receive multicast transmissions may result in reduced reliability of re-transmissions for the UEs 115. For example, the UE 115-a or the UE 115-b, or both, may fail to receive a multicast message from the base station 105-a (for example, based on a poor link condition associated with a geographic region in which the UE 115-a and the UE 115-b are located). However, if the base station 105-a is unaware that it is the UE 115-a or the UE 115-b, or both, that transmitted the NACK feedback (for example, based on the UE 115-c and the UE 115-d sharing the same PUCCH resource 230 for NACK feedback), the base station 105-a may re-transmit the multicast message using transmission parameters associated with reaching the entire coverage area 110-a, rather than using transmission parameters adapted for the region in which the UE 115-a and the UE 115-b are located (for example, by updating an MCS index, transmit beam, precoder, or some combination of these to improve the reception reliability at the UE 115-a and the UE 115-b).

To increase the reliability and the efficiency of multicast wireless communications, the base station 105-a may support grouping of PUCCH resources 230 for UE-shared NACK feedback for multicast messages. By adaptively re-transmitting multicast messages to specific UEs or groups of UEs 115 according to the resource groupings, the base station 105-a may improve the likelihood of successful reception at the specific UEs 115 or groups of UEs 115. However, signaling a dedicated PUCCH resource 230 for multicast feedback to each UE 115 within the coverage area 110-a may significantly increase the signaling overhead in the wireless communications system 200. In contrast, in some implementations of the present disclosure supporting adaptive re-transmissions of a multicast message, the base station 105-a may configure a PUCCH resource set 225 such that the UEs 115 within the coverage area 110-a may determine a PUCCH resource 230 from the PUCCH resource set 225 (for example, a UE-shared PUCCH resource set 225) with minimal additional signaling from the base station 105-a.

In some implementations, the base station 105-a may transmit an indication of a set of PUCCH resources, such as the PUCCH resource set 225, to a number of UEs 115. In some examples, the PUCCH resource set 225 may be signaled via higher layer signaling, such as RRC signaling or in a MAC CE. In some other implementations, the UEs 115 and the base station 105-a may be pre-configured with a same PUCCH resource set 225. Although the PUCCH resource set 225 is illustrated for the UE 115-a, the PUCCH resource set 225 may be similarly stored at the UE 115-b, the UE 115-c, and the UE 115-d. Additionally, some example implementations discussed herein may be described in the context of the UE 115-a but may be equally applicable to the UE 115-b, the UE 115-c, the UE 115-d, or any combination of these or other UEs 115 without exceeding the scope of the present disclosure.

In some examples, the PUCCH resource set 225 may be configured as a lookup table in memory. In other examples, the PUCCH resources 230 illustrated in the PUCCH resource set 225 may be calculated using an equation or procedure based on a UE group 215 and a PRI value 220. In FIG. 2, the PUCCH resource set 225 is illustrated as a table or grid, including a number of rows and columns. In some examples, each entry in the table may correspond to a different PUCCH resource 230 or set of PUCCH resources 230. In some specific implementations, the columns of the PUCCH resource set 225 may correspond to a number of UE groups 215 and the rows may correspond to a set of possible PM values 220. For example, each PUCCH resource 230 within the PUCCH resource set 225 may correspond to a combination of a UE group 215 and a PM value 220. As such, the PUCCH resource set 225 may correspond to an N×M table for N UE groups and M PM values.

Each UE group 215 may be associated with a group index and may correspond to a group of UEs 115. In some examples, each UE 115 within a UE group 215 may be located at a similar geographic region, may be located a similar distance from the base station 105-a, or may otherwise be associated with similar communication conditions (for example, link conditions). In some specific examples, the UE 115-a and the UE 115-b may be within a same UE group 215, such as a UE group 215-a. The UE 115-c and the UE 115-d may similarly be within a same UE group 215, such as a UE group 215-b or a UE group 215-c.

In some examples, a UE 115, such as the UE 115-a, may select a PUCCH resource 230 from the PUCCH resource set 225 and may use the selected PUCCH resource 230 for a feedback transmission (for example, a UE-shared NACK feedback transmission) in response to failing to receive or decode a multicast message from the base station 105-a. For example, the base station 105-a may transmit a multicast message to each of the UEs 115 within a coverage area 110-a over a multicast channel. In some implementations, the base station 105-a may schedule the multicast message transmission using DCI 210. The base station 105-a may transmit the DCI 210 to the UEs 115 over a communication link 205. For example, the base station 105-a may transmit the DCI 210 via a physical downlink control channel (PDCCH), a physical broadcast channel (PBCH), a multicast channel, or any number of other communication channels.

The UE 115-a may receive the DCI 210 and may determine the scheduling information for the multicast message. Additionally, the UE 115-a may identify a PRI field included in the DCI 210 and identify a PRI value 220 indicated in the PRI field. In some specific implementations, the UE 115-a may use the PRI value 220 identified in the PRI field of the DCI 210 to determine a PUCCH resource 230 or a subset of the PUCCH resources 230. For example, the UE 115-a may use the PRI value 220 to determine the row of the PUCCH resource set 225 from which the UE 115-a may select a PUCCH resource 230. In some examples, the PRI value 220 may be 2 bits. Alternatively, the PRI value 220 may include any other number of bits. Additionally or alternatively, the UE 115-a may use another DCI value—for example, different than the PRI value 220—to determine a PUCCH resource 230 for UE-shared NACK feedback.

In some examples, to determine a PUCCH resource 230 to use for NACK feedback, the UE 115-a may determine to which UE group 215 it belongs. In some implementations (for example, in network-based UE grouping implementations), the base station 105-a may directly indicate a UE group 215 to the UE 115-a via the DCI 210 or higher layer signaling. In some other implementations (for example, in UE-based UE grouping implementations), the UE 115-a may determine its own UE group 215 based on a set of communication conditions of the UE 115-a. In some examples, the set of communication conditions of the UE 115-a may be associated with the wireless communications of the UE 115-a (for example, corresponding to the downlink multicast channel conditions) and may include an RSRP, an RSRQ, an SINR, an RSSI, a CQI, a PMI, a path loss, a TA, a power headroom, or a combination thereof. Additionally or alternatively, the set of communication conditions may be measured or estimated based on receiving an SSB, receiving a CSI-RS, transmitting an SRS, or a combination thereof. In some implementations, the UE 115-a may determine the set of communication conditions based on previous wireless communications, channel measurement procedures, or both.

The UE 115-a may determine which group the UE 115-a belongs to based on the communication conditions. For example, the base station 105-a may configure the PUCCH resource set 225 to associate each UE group 215 with a set of communication conditions. Additionally or alternatively, the UE 115-a may be pre-configured to determine which communication conditions correspond to which UE group 215. The UE 115-a determining its own UE group 215—as opposed to the base station 105-a assigning the UE 115-a a UE group 215—may improve the flexibility of the system. For example, the UE 115-a may dynamically switch its UE group 215 based on changing channel conditions, movement of the UE 115-a through the coverage area 110-a, or any other changing parameters.

In some examples, the UE 115-a may determine a PUCCH resource 230 to use for UE-shared NACK feedback based on the PM value 220 identified in the DCI 210 and the determined UE group 215 for the UE 115-*a*. For example, the UE 115-*a* may determine that it currently belongs to the UE group 215-*a* based on its current channel conditions, and the UE 115-*a* may identify that the DCI 210 indicates a PRI value 220 of "01." The UE 115-*a* may determine to use the PUCCH resource 230-*a* to transmit the UE-shared NACK feedback to the base station 105-*a* (for example, according to the PUCCH resource set 225 illustrated in FIG. 2). In some specific implementations, the UE 115-*a* may determine that it belongs to more than one UE group 215 simultaneously. For example, the UE 115-*a* may determine that the UE group 215-*a* and the UE group 215-*b* both include the UE 115-*a* and may identify that the PM value 220 is "01." Based on these UE groups and this PRI, the UE 115-*a* may determine to use either the PUCCH resource 230-*a*, the PUCCH resource 230-*b*, or both for UE-shared NACK feedback. In some aspects, the UE 115-*a* may select between the PUCCH resource 230-*a* and the PUCCH resource 230-*b* based on a random—or pseudo-random— selection procedure, a UE identifier for the UE 115-*a*, a radio network temporary identifier (RNTI), or some combination thereof.

Additionally or alternatively, the PUCCH resource set 225 may include more than one PUCCH resource 230 for a UE group 215 and PRI value 220 pair (for example, within one table entry). For example, the UE 115-*a* may determine that the UE group 215-*b* includes the UE 115-*a* and that the PM value 220 is "10." The UE 115-*a* may determine to use either the PUCCH resource 230-*d* or the PUCCH resource 230-*e* based on this UE group and PM pair. In some aspects, the UE 115-*a* may choose between the PUCCH resource 230-*d* and the PUCCH resource 230-*e* based on a random selection procedure, a UE identifier, an RNTI, or some combination thereof. Additionally or alternatively, the UE 115-*a* may determine that the UE 115-*a* is included in both the UE group 215-*b* and the UE group 215-*c* and that the PRI value 220 is "10." The UE 115-*a* may determine to use any PUCCH resource 230 of the PUCCH resource 230-*c*, the PUCCH resource 230-*d*, and the PUCCH resource 230-*e* based on a random selection procedure, a UE identifier, an RNTI, or a combination thereof.

In some implementations, the UE 115-*a* may transmit NACK feedback to the base station 105-*a* using the determined PUCCH resource 230. The base station 105-*a* may receive the NACK feedback over the PUCCH resource 230 and may determine that a UE 115 within a specific UE group 215 failed to receive the multicast message based on the PUCCH resource 230. That is, in some examples, the base station 105-*a* may identify the PUCCH resource 230 on which the NACK is received, determine which UE group 215 corresponds to the identified PUCCH resource 230 (for example, according to the PM value 220 indicated in the DCI 210), and determine that at least one UE 115 within the determined UE group 215 failed to receive the multicast message. For example, if the base station 105-*a* indicates a PRI value 220 of "01" in the DCI 210 scheduling a multicast message transmission and receives UE-shared NACK feedback for the multicast message in the PUCCH resource 230-*a*, the base station 105-*a* may determine that at least one UE 115 in the UE group 215-*a* failed to receive the multicast message. Furthermore, if the base station 105-*a* does not receive UE-shared NACK feedback for the multicast message in the PUCCH resource 230-*b*, the base station 105-*a* may operate as if each UE 115 in the UE group 215-*b* successfully received the multicast message.

In some examples, the base station 105-*a* may re-transmit, over one or more multicast channels, the multicast message using a set of transmission parameters based on the PUCCH resource 230 and PRI value 220. That is, in some implementations, the base station 105-*a* may re-transmit the multicast message using an updated, or adapted, set of transmission parameters based on the UE 115 or the UE group 215 that failed to successfully receive the multicast message. In this manner, the base station 105-*a* may increase the likelihood that the re-transmission of the multicast message will be successfully received at the UE 115 or the UE group 215 that previously failed to receive the multicast message because the base station 105-*a* re-transmits the multicast message using transmission parameters corresponding to the communication conditions of the UE 115 or the UE group 215 that failed to receive the multicast message. In some examples, the set of transmission parameters may include a transmit beam, spatial relation information, an MCS, a pre-coding matrix, or a combination thereof. For example, the base station 105-*a* may update an MCS value for re-transmission such that the re-transmitted multicast message is more likely to be successfully received a particular distance from the base station 105-*a*. In another example, the base station 105-*a* may update a transmit beam or pre-coding matrix for re-transmission such that the multicast message is re-transmitted using a communication beam directed at a particular group of UEs 115 (for example, the group of UEs 115 including at least one UE 115 that failed to receive the multicast message).

In some other examples, the PUCCH resource set 225 may be an N×1 table, and the UE 115 may determine which PUCCH resource 230 to use for NACK feedback based on the UE group 215 to which the UE 115 belongs (for example, the PUCCH resource 230 may be independent of a PRI value when the PUCCH resource set 225 is N×1). In such examples, the UE 115-*a* may determine to use one of the PUCCH resources 230 based on the set of communication conditions of the UE 115-*a*.

Figure 3:
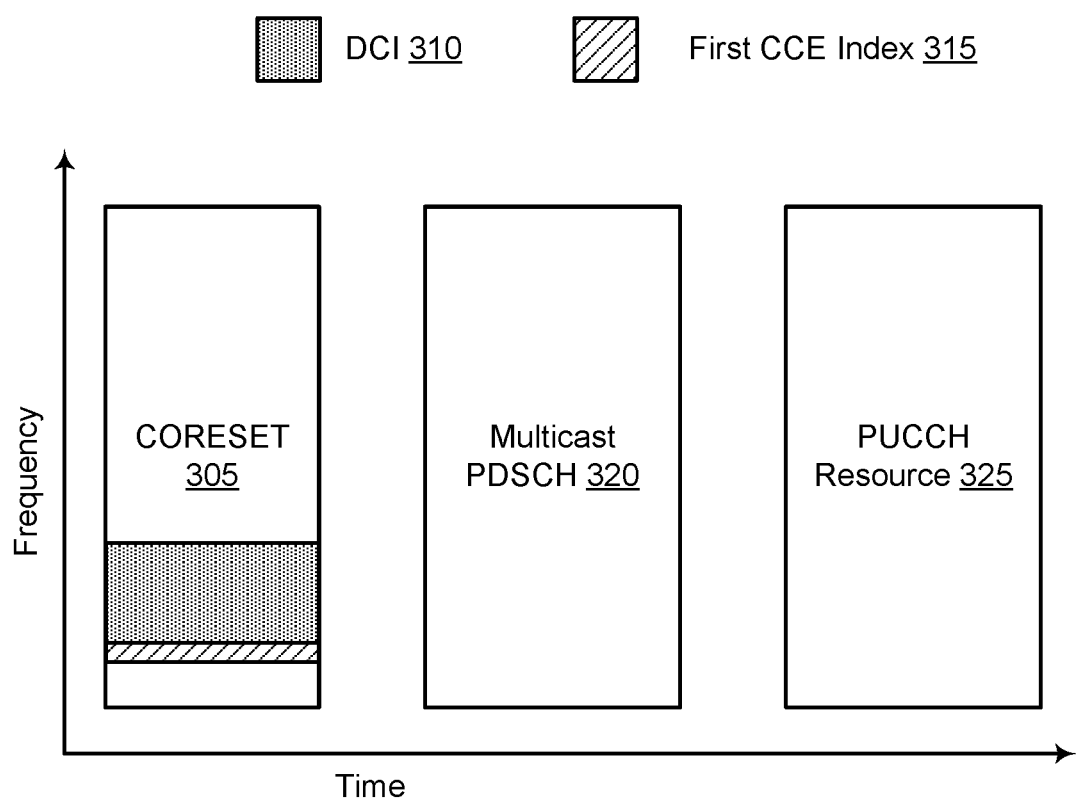
FIG. 3 illustrates an example of a resource allocation timeline that supports resource selection for UE-shared multicast feedback in accordance with aspects of the present disclosure.

FIG. 3 illustrates an example of a resource allocation timeline 300 that supports resource selection for UE-shared multicast feedback in accordance with aspects of the present disclosure. In some examples, the resource allocation timeline 300 may be implemented by one or more wireless devices in a wireless communications system 100 or a wireless communications system 200. In some implementations, the resource allocation timeline 300 may support improved reliability of multicast re-transmissions while maintaining low overhead based on providing a number of indications that may be used by a UE 115, such as a UE 115-*a*, to determine a PUCCH resource to use for NACK feedback with minimal additional signaling from a base station 105, such as a base station 105-*a*.

In some implementations, a base station 105 and a UE 115 may perform multicast communications employing a UE-shared NACK feedback configuration based on the resource allocation timeline 300. For example, the base station 105 may transmit DCI 310, which may be an example of DCI 210 as described with reference to FIG. 2, including scheduling information for a multicast message. In some examples, the base station 105 may transmit DCI 310 to the UE 115 in a CORESET 305 and the base station 105 may indicate, via the DCI 310, that the multicast message is scheduled for transmission in the multicast PDSCH 320.

The UE 115 may receive the DCI 310 within the CORESET 305 based on monitoring a number of CCEs for the DCI 310. In some examples, the UE 115 may monitor all CCEs of the CORESET 305. In some other examples, the UE 115 may monitor a subset of the CCEs of the CORESET 305. The UE 115 may receive the DCI 310 and may identify the scheduling information for the multicast transmission. Additionally, the UE 115 may identify a PRI field within the DCI 310 and may identify a PRI value in the PRI field. The UE 115 may monitor multicast PDSCH 320 for the multicast message based on the scheduling information included in the DCI 310. In some implementations, the UE 115 may fail to successfully receive the multicast message—for example, after successfully receiving the DCI 310—and may determine to transmit NACK feedback to the base station 105. In some examples, the UE 115 may use the PRI value from the DCI 310 and a set of communication conditions of the UE 115 to determine a PUCCH resource 325 from a set of PUCCH resources configured by the base station 105, as described in more detail with reference to FIG. 2.

Additionally or alternatively, the base station 105 may configure the set of PUCCH resources based on a variety of other indications (without additional signaling or with minimal additional signaling). In some example implementations, the base station 105 may configure the set of PUCCH resources in a lookup table, and each entry in the lookup table may correspond to a different PUCCH resource 325 (or, in some examples, more than one PUCCH resource 325). In some specific implementations, the base station 105 may configure the set of PUCCH resources such that the columns of the lookup table may be defined by a number of UE groups 215 and the rows may be defined by a combination of the PM value and one or more frequency characteristics of the DCI 310. In some example implementations, the rows of the lookup table may be defined according to Equation (1) below. In some examples, $r_{PUCCH}$ may correspond to a row of the set of PUCCH resources, $n_{CCE,0}$ may correspond to the first CCE index 315 of the DCI 310, $N_{CCE}$ may correspond to the number of CCEs in the CORESET 305 that the UE 115 monitors for the DCI 310, and $\Delta_{PRI}$ may correspond to the PRI value included in the DCI 310. In some examples, $N_{CCE}$ may correspond to all of a number of CCEs within the CORESET 305 or may correspond to a subset of the number of CCEs within the CORESET 305.

$$r_{PUCCH} = \left\lfloor \frac{2 \cdot n_{CCE,0}}{N_{CCE}} \right\rfloor + 2 \cdot \Delta_{PRI} \quad (1)$$

The UE 115 may use Equation (1) to determine a PUCCH resource 325 of the set of PUCCH resources. For example, the UE 115 may use Equation (1) to determine an $r_{PUCCH}$ value and may use this $r_{PUCCH}$ value, along with a UE group identified for the UE 115, to determine a PUCCH resource for NACK feedback. In some examples, $r_{PUCCH}$ may correspond to row index 420, as described with reference to FIG. 4. For example, the UE 115 may determine which row of a PUCCH resource set 225, a PUCCH resource set 425-*a*, or a PUCCH resource set 425-*b* that the UE 115 may use for NACK feedback based on the value of $r_{PUCCH}$ as determined by Equation (1). A UE 115 may implement additional or alternative values to determine the PUCCH resource for UE-shared NACK feedback. For example, the UE 115 may use any DCI-indicated value, channel condition information, UE-specific parameter, or combination thereof to determine the PUCCH resource for NACK feedback.

Figure 4:
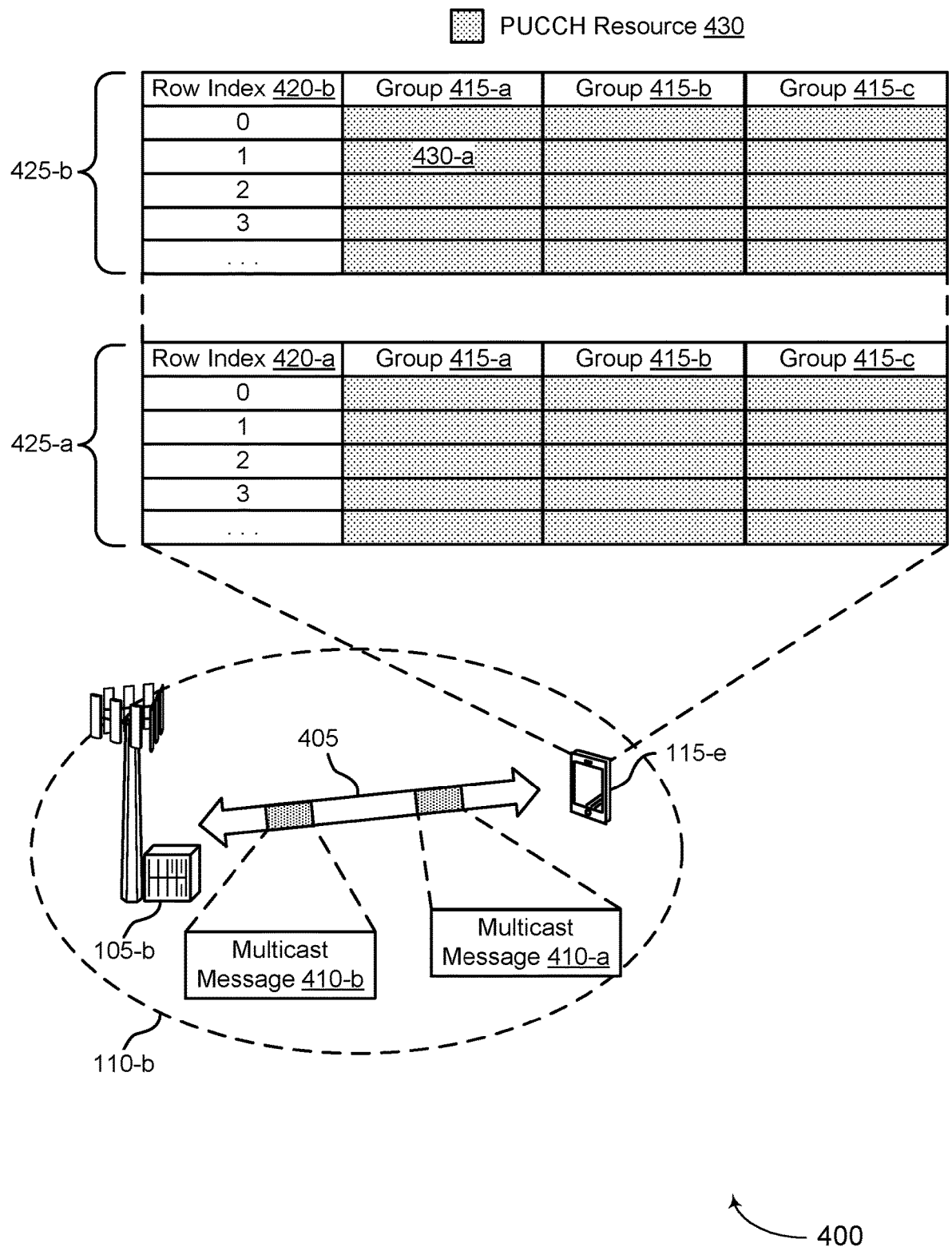
FIG. 4 illustrates an example of a wireless communications system that supports resource selection for UE-shared multicast feedback in accordance with aspects of the present disclosure.

FIG. 4 illustrates an example of a wireless communications system 400 that supports resource selection for UE-shared multicast feedback in accordance with aspects of the present disclosure. In some examples, the wireless communications system 400 may implement aspects of a wireless communications system 100 or a wireless communications system 200. In some implementations, the wireless communications system 400 may support improved reliability in multicast communications employing UE-shared NACK feedback based on configuring a set of PUCCH resources such that a UE 115, such as a UE 115-*e*, may determine a PUCCH resource 430 for transmitting feedback to a base station, such as a base station 105-*b*, with minimal additional signaling form the base station 105-*b*.

In some implementations, the UE 115-*e* may receive one or more multicast messages 410 from the base station 105-*b*. For example, the base station 105-*b* may transmit multiple scheduled multicast messages 410 to a number of UEs 115 within a coverage area 110-*b* over a communication link 405. In some implementations, these multiple multicast messages 410 may correspond to a same NACK feedback opportunity for a UE 115-*e*, such that the UE 115-*e* determines how to transmit a UE-shared NACK feedback message based on the reception of all of these multiple multicast messages 410 at the UE 115-*e*.

In some specific implementations of the present disclosure, the base station 105-*b* may configure a number of PUCCH resources 430 into one or more PUCCH resource sets 425. For example, the base station 105-*b* may configure the PUCCH resource set 425-*a* and the PUCCH resource set 425-*b*. In some examples, the PUCCH resources 430 included within each PUCCH resource set 425 may be different, such that there is no overlap between the PUCCH resources 430 included in the PUCCH resource set 425-*a* and the PUCCH resource set 425-*b*. In some other examples, the PUCCH resources 430 included within each PUCCH resource set 425 may be partially the same, such that at least some of the entries in the PUCCH resource set 425-*a* may be the same as some of the entries in the PUCCH resource set 425-*b*. In some aspects, one or more of the PUCCH resource sets 425 may be M×N tables, and the base station 105-*b* may configure a PUCCH resource set 425-*a* and a PUCCH resource set 425-*b* such that the columns of both may be defined by UE groups 415 (including a UE group 415-*a*, a UE group 415-*b*, and a UE group 415-*c*) and the rows may be defined by a row index 420-*a* for the PUCCH resource set 425-*a* and a row index 420-*b* for the PUCCH resource set 425-*b*. Alternatively, the rows may be defined by a PRI value. In some example implementations, UE groups 415 may correspond to groups of UEs 115 associated with similar communication conditions and a row index 420 may correspond to an $r_{PUCCH}$ vale as determined by Equation (1). In some examples, the row index 420-*a* may be the same as or may be different than the row index 420-*b*, depending on the configuration of the DCI or the number of DCIs received by the UE 115-*e*.

In some examples, the UE 115-*e* may determine which PUCCH resource set 425 to use, and the UE 115-*e* may determine a PUCCH resource 430 for NACK feedback from this PUCCH resource set 425. In some implementations, the UE 115-*e* may determine which PUCCH resource set 425 to use based on which or how many of a number of multicast messages 410 the UE 115-*e* fails to successfully receive. For example, the base station 105-*b* may transmit a multicast message 410-*a* and a multicast message 410-*b* and the UE 115-*e* may determine to use the PUCCH resource set 425-*a* or the PUCCH resource set 425-*b* based on which or how many of the multicast messages 410 are not received by the UE 115-*e*.

In some examples, the UE 115-*e* may successfully receive the multicast message 410-*a*, but may fail to successfully receive the multicast message 410-*b*. In such examples, the UE 115-*e* may determine to use the PUCCH resource set 425-*b* based on failing to successfully receive the multicast message 410-*b*. In an alternative example, the UE 115-*e* may fail to successfully receive the multicast message 410-*a*, but may successfully receive the multicast message 410-*b*, and the UE 115-*e* may determine to use the PUCCH resource set 425-*a*. The UE 115-*e* may determine a PUCCH resource 430 for UE-shared NACK feedback from the determined PUCCH resource set 425 using any number of techniques described herein (for example, based on a PM value and a UE group 415).

Additionally or alternatively, the UE 115-*e* may determine to use the PUCCH resource set 425-*a* if the UE 115-*e* fails to successfully receive a number of multicast messages 410 less than or equal to a threshold number of multicast messages 410. Additionally, the UE 115-*e* may determine to use the PUCCH resource set 425-*b* if the UE 115-*e* fails to successfully receive more than the threshold number of multicast messages 410. For example, the UE 115-*e* may determine to use the PUCCH resource set 425-*a* if one of the multicast messages 410 is unsuccessfully received. In some additional examples, the UE 115-*e* may determine to use the PUCCH resource set 425-*b* if two or more multicast messages 410 are unsuccessfully received.

In some specific implementations, the base station 105-*b* may associate PUCCH resources 430 included in the PUCCH resource set 425-*a* with a first set of network conditions associated with the UE 115-*e* and may associate PUCCH resources 430 included in the PUCCH resource set 425-*b* with a second set of network conditions associated with the UE 115-*e*. In some examples, the first set of network conditions may be associated with better network conditions than the second set of network conditions. Based on the estimated network conditions, the base station 105-*b* may use a more strongly adapted set of transmission parameters to re-transmit a multicast message 410 when the base station 105-*b* receives a NACK feedback message over a PUCCH resource 430 included in the PUCCH resource set 425-*b* than if the base station 105-*b* receives a NACK feedback message over a PUCCH resource 430 included in the PUCCH resource set 425-*a*. Additionally or alternatively, the base station 105-*b* may determine which multicast message 410 or multicast messages 410 to re-transmit based on the PUCCH resource 430 on which a UE-shared NACK is received.

The UE 115-*e* may be associated with a UE group 415-*a* and may determine a row index value—for example, for the row index 420-*a* and the row index 420-*b*—of "1." However, the UE 115-*e* may determine whether to select a PUCCH resource 430 for UE-shared NACK feedback from the PUCCH resource set 425-*a* or from the PUCCH resource set 425-*b* based on one or more multicast messages 410 that the UE 115-*e* fails to receive. If the UE 115-*e* fails to successfully receive more than a threshold number of multicast messages 410 (and determines to use the PUCCH resource set 425-*b* rather than the PUCCH resource set 425-*a*), the UE 115-*e* may transmit NACK feedback on a PUCCH resource 430-*a*. The base station 105-*b* may determine that the UE 115-*e*, or at least one UE 115 from the UE group 415-*a*, is associated with network conditions below a threshold quality and the base station 105-*b* may re-transmit the one or more multicast messages 410 using a set of transmission parameters that is more preferential to the UE group 415-*a* based on receiving the NACK feedback on the PUCCH resource 430-*a*. Additionally or alternatively, the base station 105-*b* may determine to re-transmit both the multicast message 410-*a* and the multicast message 410-*b* to the UE group 415-*a* based on the PUCCH resource 430-*a* being selected from the PUCCH resource set 425-*b*.

Although the PUCCH resource sets 225 and 425 are illustrated as tables with particular row and column formats, these PUCCH resource sets may be configured, stored in memory, or both in any number of ways. For example, the PUCCH resource sets may be stored as functions or equations rather than lookup tables. Additionally or alternatively, the PUCCH resource sets may use additional or alternative inputs, rows identifiers, column identifiers, or some combination thereof.

Figure 5:
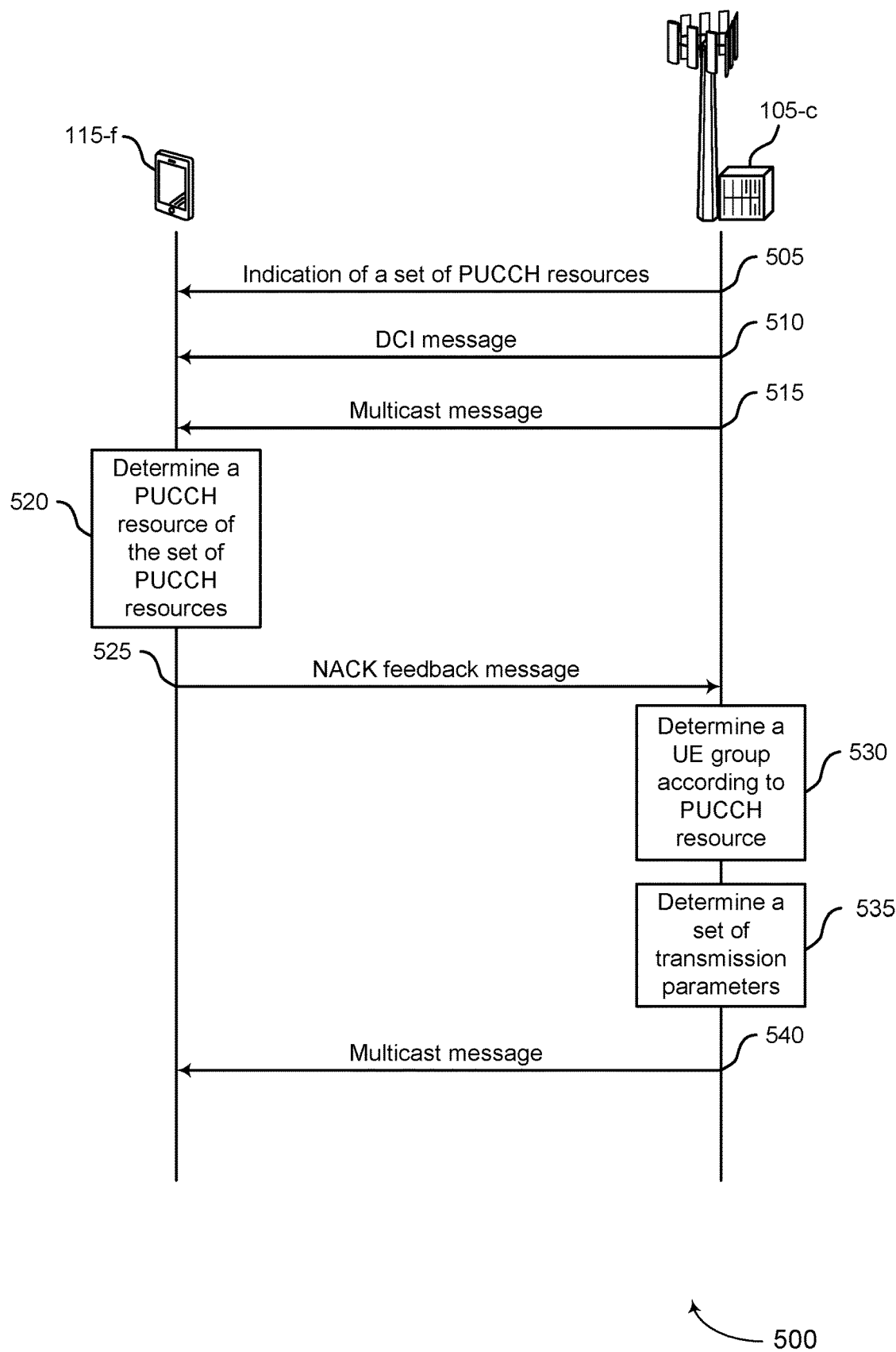
FIGS. 5 and 6 illustrate examples of process flows that support resource selection for UE-shared multicast feedback in accordance with aspects of the present disclosure.

FIG. 5 illustrates an example of a process flow 500 that supports resource selection for UE-shared multicast feedback in accordance with aspects of the present disclosure. In some examples, the process flow 500 may implement aspects of a wireless communications system 100 or a wireless communications system 200. The process flow 500 may include a UE 115-*f* and a base station 105-*c*, which may be examples of the corresponding devices described with reference to FIGS. 1-4. The UE 115-*f* and the base station 105-*c* may implement one or more techniques supporting reliable multicast communications employing a UE-shared NACK feedback resource configuration. Alternative examples of the process flow may be implemented, in which some steps are performed in a different order than described or are not performed at all. In some examples, steps may include additional features not mentioned below, or further steps may be added.

At 505, the base station 105-*c* may transmit, over one or more multicast channels, an indication of a set of uplink control channel resources for reporting feedback for multicast communications. The set of uplink control channel resources may be a PUCCH resource set as described with reference to FIGS. 2-4. The PUCCH resource set may be shared by a number of UEs 115 associated with the multicast communications, including the UE 115-*f*. In some implementations, the base station 105-*c* may transmit, over the one or more multicast channels, a second indication of a second set of PUCCH resources for reporting feedback for the multicast communications. In some specific implementations, the base station 105-*c* may transmit the second indication of the second set of PUCCH resources to support more informative feedback from the UE 115-*f*, such as the NACK feedback associated with the PUCCH resource set 425-*a* and the PUCCH resource set 425-*b* as described with reference to FIG. 4. The base station 105-*c* may transmit the indication of the set of PUCCH resources and, in some examples, the second indication of the second set of PUCCH resources to the UE 115-*f* in an RRC message, in a MAC CE, or both. In some implementations, the base station 105-*c* may configure the one or more sets of PUCCH resources for NACK feedback for a number of UEs 115, including UE 115-*f*. Additionally or alternatively, the UE 115-*f* and the base station 105-*c* may be pre-configured with the set of PUCCH resources for NACK feedback.

At 510, the base station 105-*c* may transmit a DCI message to the UE 115-*f* scheduling a multicast message. In some examples, the DCI message may include an uplink control channel resource indicator. The uplink control channel resource indicator may be an example of a PRI field containing a PRI value as described with reference to FIGS. 2-4. The UE 115-*f* may receive the DCI message and may detect the PRI value in the PRI field of the DCI message.

In some implementations, the UE 115-*f* may monitor for the DCI message at a number of CCEs. The UE 115-*f* may detect and receive the DCI message in one or more CCEs of a CORESET based on the number of CCEs that the UE 115-*f* monitors. The UE 115-f may monitor all of the CCEs within the CORESET or may monitor a subset of the CCEs within the CORESET. In some examples, the UE 115-f may identify the first CCE index of the DCI message.

At 515, the base station 105-c may transmit, over the one or more multicast channels, a multicast message to the UE 115-f according to the scheduling information included in the DCI message. In some examples, the base station 105-c may transmit a number of multicast messages to the UE 115-f In some examples, the multicast message may be a part of a multicast transmission to a number of UEs 115. The UE 115-f may monitor and attempt to receive the multicast message according to the scheduling information included in the DCI message. In some examples, the UE 115-f may fail to successfully receive the multicast message.

At 520, the UE 115-f may determine a PUCCH resource of the set of PUCCH resources based on a set of communication conditions and the PRI value. The UE 115-f may determine a UE group, such as a UE group 215 or a UE group 415 as described with reference to FIGS. 2 and 4, of a number of UE groups based on the set of communication conditions. In some examples, the UE 115-f may determine a UE group based on determining that the UE group includes the UE 115-f. The determined UE group may correspond to a subset of PUCCH resources of the set of PUCCH resources. In some examples, the PUCCH resources of the subset of PUCCH resources corresponding to the determined UE group may each be associated with a respective (or different) PRI value. In some specific implementations, the UE 115-f may determine a PUCCH resource from the subset of the PUCCH resources according to the PRI value included in the DCI message.

In some other specific implementations, the UE 115-f may determine the subset of PUCCH resources corresponding to the UE group, and each PUCCH resource of the subset of PUCCH resources may correspond to a respective a row index value, such as a value for a row index 420 as described with reference to FIG. 4. In some examples, the UE 115-f may determine the row index value based on the first CCE index of the DCI message, the number of CCEs in the CORESET that the UE 115-f monitors for the DCI message, the PM value included in the DCI message, or a combination thereof. The UE 115-f may determine a PUCCH resource from the subset of the PUCCH resources according to the row index value calculated by the UE 115-f.

Additionally or alternatively, the UE 115-f may determine a PUCCH resource based on specific signaling from the base station 105-c. For example, the base station 105-c may signal to the UE 115-f to which group the UE 115-f belongs and the UE 115-f may determine a PUCCH resource based on the signaling from the base station 105-c.

At 525, the UE 115-f may transmit a NACK feedback message for the multicast message on the determined PUCCH resource. In some examples, the NACK feedback message may indicate NACK feedback for a number of multicast messages. The base station 105-c may receive the NACK feedback message from the UE 115-f and, in some examples, may also receive a number of additional NACK feedback messages from one or more additional UEs 115 participating in the multicast communications.

At 530, the base station 105-c may determine the UE group of the set of UE groups including the UE 115-f and any additional UEs 115 that transmitted a NACK feedback message according to the PUCCH resource and the PM value. For example, the base station 105-c may determine which PUCCH resource corresponds to which UE group according to the PM value and, based on the PUCCH resource used for NACK feedback, may identify a UE group including a UE 115 (for example, the UE 115-f) that failed to receive the multicast message at 515.

At 535, the base station 105-c may determine a set of transmission parameters based on the determined UE group. In some specific implementations, the base station 105-c may determine the set of transmission parameters based on the PUCCH resource used by the UE 115-f to transmit the NACK feedback message, the PM value, a first CCE of the one or more CCEs of the DCI message, a number of CCEs in the CORESET, or some combination of these parameters. In some examples, the determined UE group may correspond to a geographic region including the UE 115-f, and the base station 105-c may determine the set of transmission parameters based on the geographic region of the UE 115-f. For example, the base station may determine, or update, the set of transmission parameters such that an updated MCS, an updated pre-coding matrix, an updated transmit beam, or a combination thereof may increase the likelihood that the UE 115-f may successfully receive a re-transmission of the multicast message.

At 540, the base station 105-c may re-transmit the multicast message, over the one or more multicast channels, in response to the NACK feedback message using the determined set of transmission parameters. In some examples, the base station 105-c may re-transmit multiple multicast messages to the UE 115-f. For example, the base station 105-c may have transmitted a first number of multicast messages to the UE 115-f at 515, and the base station 105-c may re-transmit a second number of multicast messages (for example, a subset of the first number of multicast messages) based on receiving a NACK feedback message indicating that the UE 115-f failed to successfully receive the second number of multicast messages.

Figure 6:
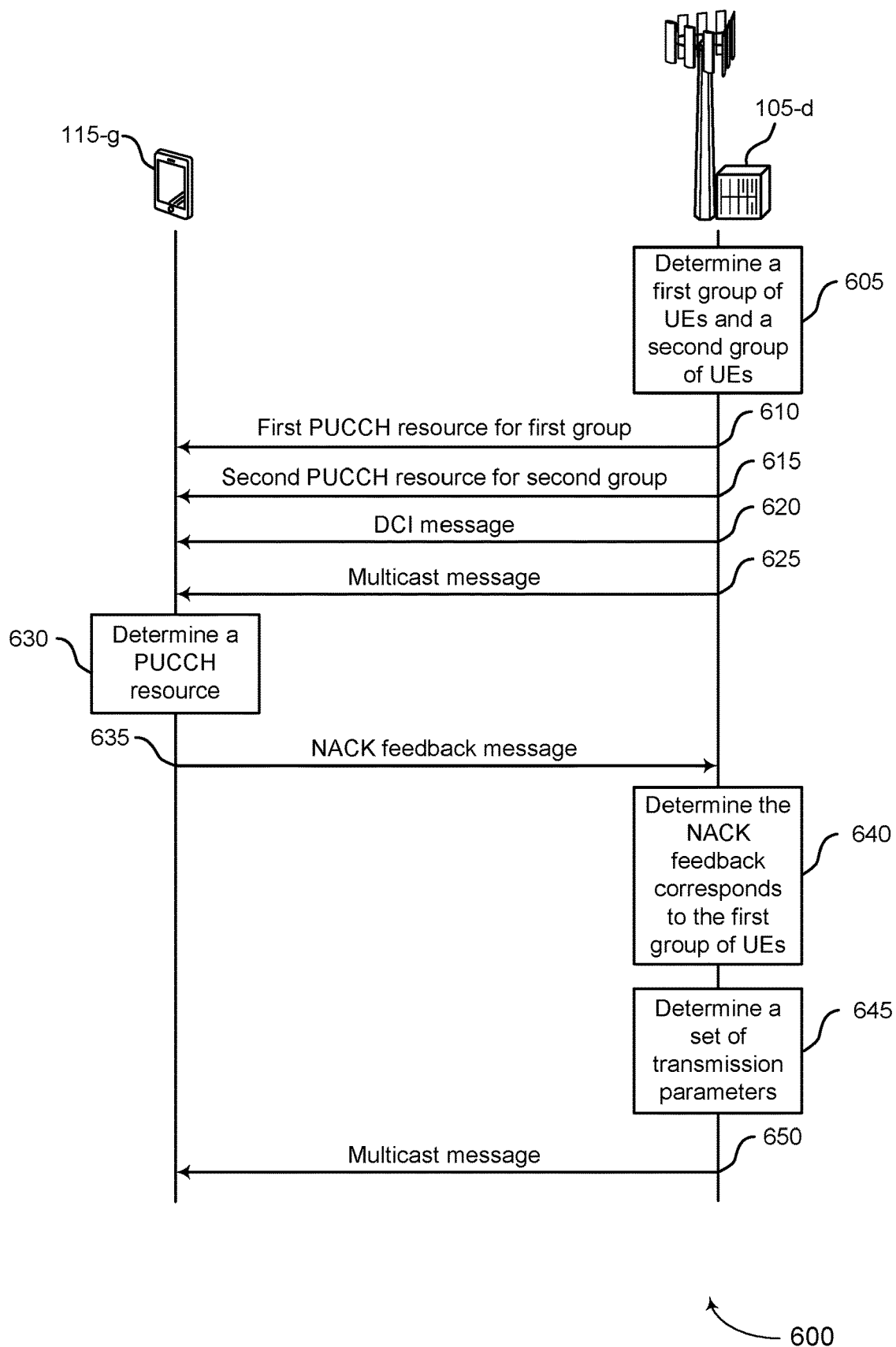

FIG. 6 illustrates an example of a process flow 600 that supports resource selection for UE-shared multicast feedback in accordance with aspects of the present disclosure. In some examples, the process flow 600 may implement aspects of a wireless communications system 100 or a wireless communications system 200. The process flow 600 may include a UE 115-g and a base station 105-d, which may be examples of the corresponding devices described with reference to FIGS. 1-4. The UE 115-g and the base station 105-d may implement one or more techniques supporting reliable multicast communications employing a UE-shared NACK feedback resource configuration. Alternative examples of the process flow may be implemented, in which some steps are performed in a different order than described or are not performed at all. In some examples, steps may include additional features not mentioned below, or further steps may be added.

At 605, the base station 105-d may determine, for a number of UEs 115, a first group of UEs 115 and a second group of UEs 115 different than the first group of UEs 115 based on a set of communication conditions for each UE 115, such as the UE 115-g.

At 610, the base station 105-d may transmit, over one or more multicast channels, a first indication for a first PUCCH resource (for example, a single PUCCH resource or a PUCCH resource set) for reporting feedback for multicast communications. In some examples, the first PUCCH resource may be for the first group of UEs 115 and the first group of UEs 115 may share the first PUCCH resource for feedback messages for the multicast communications. In some aspects, the first indication may be transmitted in one or more of an RRC message or a MAC CE. In some implementations, the first indication may indicate a first set of PUCCH resources including the first PUCCH resource.

In some implementations, the first indication of the first PUCCH resource for the first group of UEs 115 may be transmitted to a number of UEs 115 both within and external to the first group of UEs 115. Each UE 115, such as the UE 115-g, may be pre-configured or may otherwise determine (for example, based on communication conditions at the UE 115-g or based on an indication within the first indication) to listen to or to ignore the first indication depending on whether the UE 115 is included in the first group of UEs 115.

At 615, the base station 105-d may transmit, over the one or more multicast channels, a second indication of a second PUCCH resource (for example, a single PUCCH resource or a PUCCH resource set) for reporting feedback for multicast communications. In some examples, the second PUCCH resource may be for the second group of UEs 115 and the second group of UEs 115 may share the second PUCCH resource for feedback messages for the multicast communications. In some aspects, the second indication may be transmitted in an RRC message or a MAC CE. In some implementations, the second indication may indicate a second set of PUCCH resources including the second PUCCH resource.

In some implementations, the second indication of the second PUCCH resource for the second group of UEs 115 may be transmitted to a number of UEs 115 both within and external to the second group of UEs 115. In some examples, the first and second indications of PUCCH resources may be transmitted together in a single message.

At 620, the base station 105-d may transmit a DCI message scheduling a multicast message transmission. The DCI message may include a PRI value. In some examples, the DCI message may include a PRI field, and the UE 115-g may receive the DCI message and identify the PRI value within the PRI field of the DCI message. In some implementations, the UE 115-g may receive the DCI message within a CORESET including a number of CCEs.

At 625, the base station 105-d may transmit, over the one or more multicast channels, the multicast message. In some aspects, the base station 105-d may transmit a number of multicast messages. The UE 115-g may monitor for and attempt to receive the multicast message based on the scheduling information included in the DCI message. In some examples, the UE 115-g may fail to successfully receive the multicast message.

At 630, the UE 115-g may determine a PUCCH resource to use for a NACK feedback message to the base station 105-d. For example, the UE 115-g may determine the PUCCH resource based on an allocation of one or more PUCCH resources to the UE 115-g from the base station 105-d. This allocation may be based on network-based UE grouping performed at the base station 105-d. Depending on whether the base station 105-d, at 610, transmitted an indication of a single first PUCCH resource or a first set of PUCCH resources, the UE 115-g may use the single first PUCCH resource or select a PUCCH resource from the first set of PUCCH resources. In some examples, the base station 105-d may indicate that the UE 115-g may use a PUCCH resource from a first set of PUCCH resources, and the UE 115-g may select a resource from the first set of PUCCH resources based on the PRI value. Additionally or alternatively, the UE 115-g may determine to select a resource from the first set of PUCCH resources based on the PRI value, a number of CCEs in the CORESET, a first CCE index value of the DCI message within the CORESET, or some combination thereof.

At 635, the UE 115-g may transmit a NACK feedback message to the base station 105-d for the multicast message using the determined PUCCH resource. In some aspects, the base station 105-d may receive, from a number of UEs 115, one or more additional NACK feedback messages for the multicast message. In some specific examples, the base station 105-d may receive the NACK feedback messages on the first PUCCH resource or on a PUCCH resource included within the first set of PUCCH resources.

At 640, the base station 105-d may determine that the PUCCH resource associated with the NACK feedback message received from the UE 115-g corresponds to the first PUCCH resource or a PUCCH resource included within the first set of PUCCH resources. Based on this determination, the base station 105-d may further determine that a number of UEs 115 (for example, including the UE 115-g) of the first group of UEs 115 failed to receive the multicast message.

At 645, the base station 105-d may determine to use an adapted set of transmission parameters corresponding to the first group of UEs based on receiving the NACK feedback message on the first PUCCH resource or on the PUCCH resource included within the first set of PUCCH resources.

At 650, the base station 105-d may re-transmit, over the one or more multicast channels, the multicast message in response to the NACK feedback message using the adapted set of transmission parameters corresponding to the first group of UEs based on receiving the NACK feedback message on the first PUCCH resource or on the PUCCH resource included within the first set of PUCCH resources.

Figure 7:
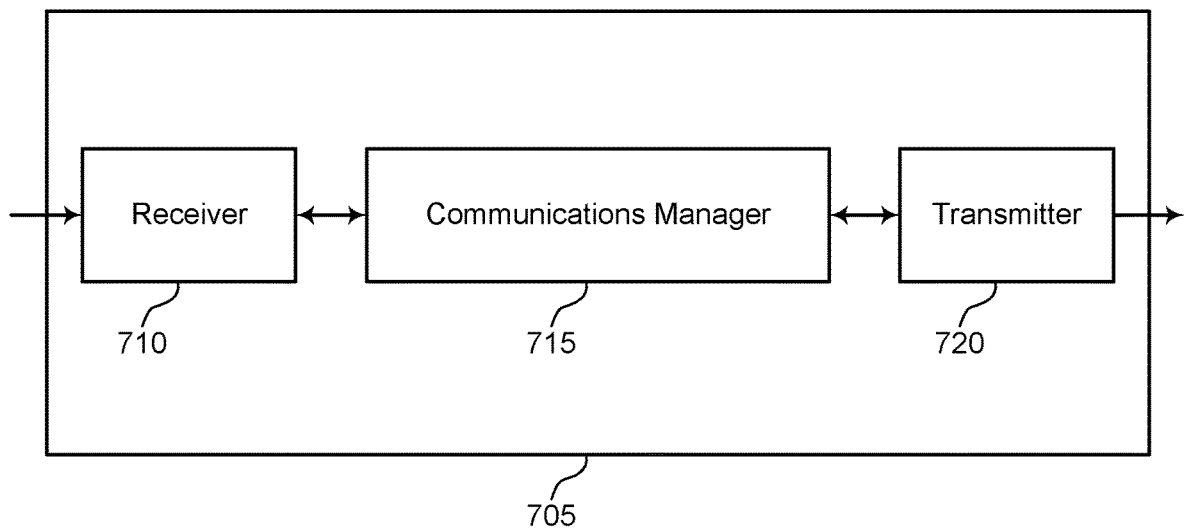
FIGS. 7 and 8 show block diagrams of devices that support resource selection for UE-shared multicast feedback in accordance with aspects of the present disclosure.

FIG. 7 shows a block diagram of a device 705 that supports resource selection for UE-shared multicast feedback in accordance with aspects of the present disclosure. The device 705 may be an example of aspects of a UE 115 as described herein. The device 705 may include a receiver 710, a communications manager 715, and a transmitter 720. The communications manager 715 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to resource selection for UE-shared multicast feedback). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive an indication of a set of uplink control channel resources for reporting acknowledgment feedback by the UE for multicast communications, the set of uplink control channel resources shared by a set of UEs associated with the multicast communications. The communications manager 715 may additionally receive a DCI message including an uplink control channel resource indicator and scheduling a multicast message, determine an uplink control channel resource of the set of uplink control channel resources based on a set of communication conditions and the uplink control channel resource indicator, and transmit a NACK feedback message for the multicast message on the determined uplink control channel resource. The communications manager 715 may be an example of aspects of the communications manager 1010 described herein.

The communications manager 715 as described herein may be implemented to realize one or more potential advantages. One implementation may allow the device 705 to receive multicast re-transmissions with a greater likelihood of successful reception. For example, a base station 105 may adaptively update a set of transmission parameters for a re-transmission of a multicast message based on which UE 115, or which group of UEs 115, failed to successfully receive an initial multicast message based on the PUCCH resource used by the device 705 to transmit NACK feedback. Supporting targeted multicast re-transmissions for a group of UEs may reduce channel overhead, as the base station 105 may reduce the number of re-transmissions performed in order for the device 705 to successfully receive a multicast message. Moreover, the device 705 may experience improvements in network efficiency with minimal additional signaling based on the configuration of one or more sets of PUCCH resources to be used for UE-shared NACK feedback.

Based on techniques for improving the likelihood of successful multicast re-transmissions with minimal additional signaling as described herein, a processor of the device 705 may be associated with fewer processing computations and less processing time, which may result in improved power savings and increased battery life. For example, by improving the likelihood that the device 705 successfully receives a multicast re-transmission targeted to the device 705 (or a group of UEs 115 including the device 705), the device 705 may perform fewer monitoring and reception processes associated with receiving multicast re-transmissions, as well as fewer UE-shared NACK feedback transmissions. As such, the device 705 may reduce the number of times that it ramps up processing units controlling the receiver 710, the communications manager 715, the transmitter 720, or a combination thereof.

The communications manager 715, or its sub-components, may be implemented in hardware, code (for example, software or firmware) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
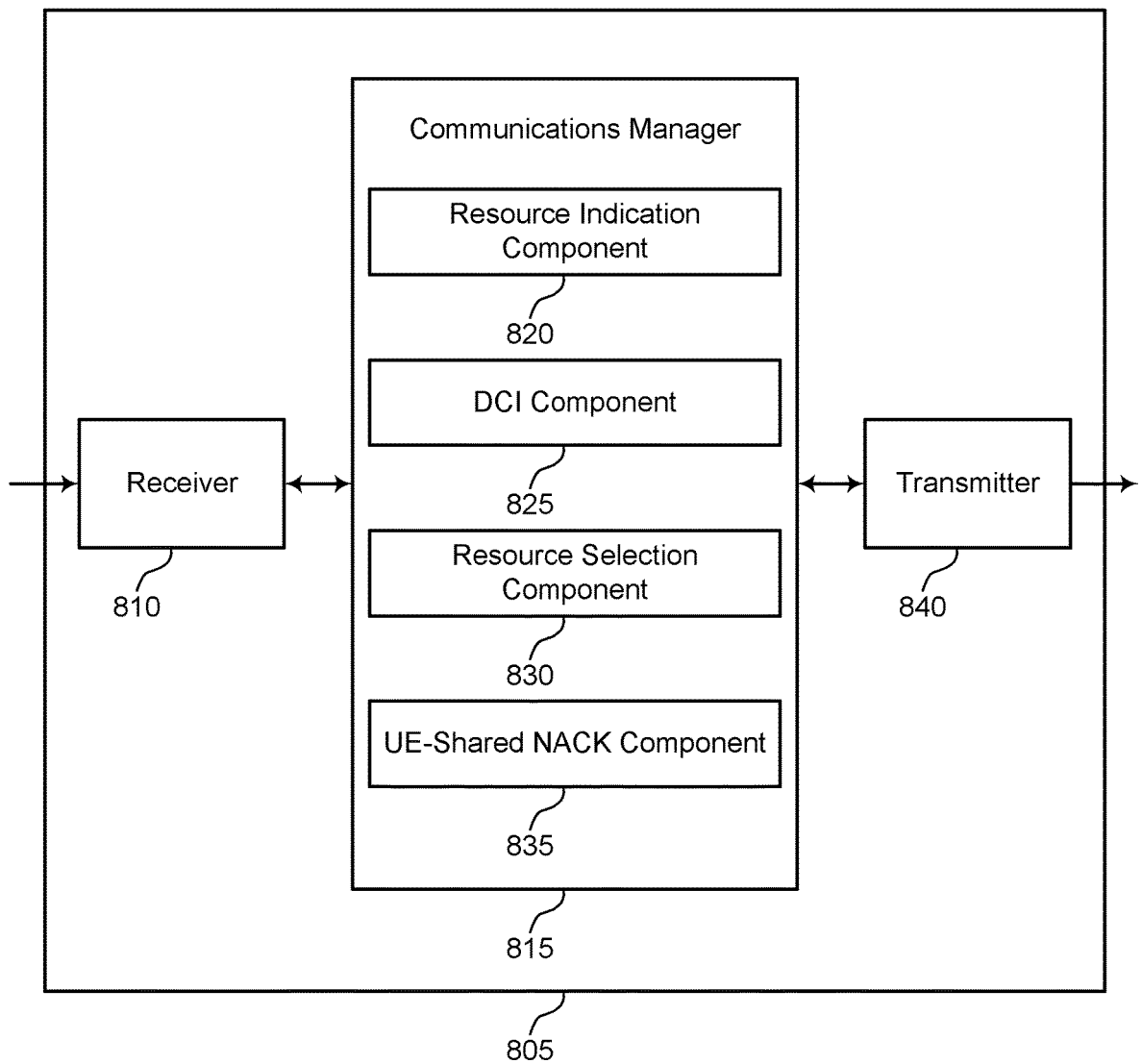

FIG. 8 shows a block diagram of a device 805 that supports resource selection for UE-shared multicast feedback in accordance with aspects of the present disclosure. The device 805 may be an example of aspects of a device 705 or a UE 115 as described herein. The device 805 may include a receiver 810, a communications manager 815, and a transmitter 840. The communications manager 815 can be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to resource selection for UE-shared multicast feedback). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a resource indication component 820, a DCI component 825, a resource selection component 830, and a UE-shared NACK component 835. The communications manager 815 may be an example of aspects of the communications manager 1010 described herein.

The resource indication component 820 may receive an indication of a set of uplink control channel resources for reporting acknowledgment feedback by the UE for multicast communications, the set of uplink control channel resources shared by a set of UEs associated with the multicast communications. The DCI component 825 may receive a DCI message including an uplink control channel resource indicator and scheduling a multicast message.

The resource selection component 830 may determine an uplink control channel resource of the set of uplink control channel resources based on a set of communication conditions and the uplink control channel resource indicator. The UE-shared NACK component 835 may transmit a NACK feedback message for the multicast message on the determined uplink control channel resource.

The transmitter 840 may transmit signals generated by other components of the device 805. In some examples, the transmitter 840 may be collocated with a receiver 810 in a transceiver component. For example, the transmitter 840 may be an example of aspects of the transceiver 1020 described with reference to FIG. 10. The transmitter 840 may utilize a single antenna or a set of antennas.

Figure 9:
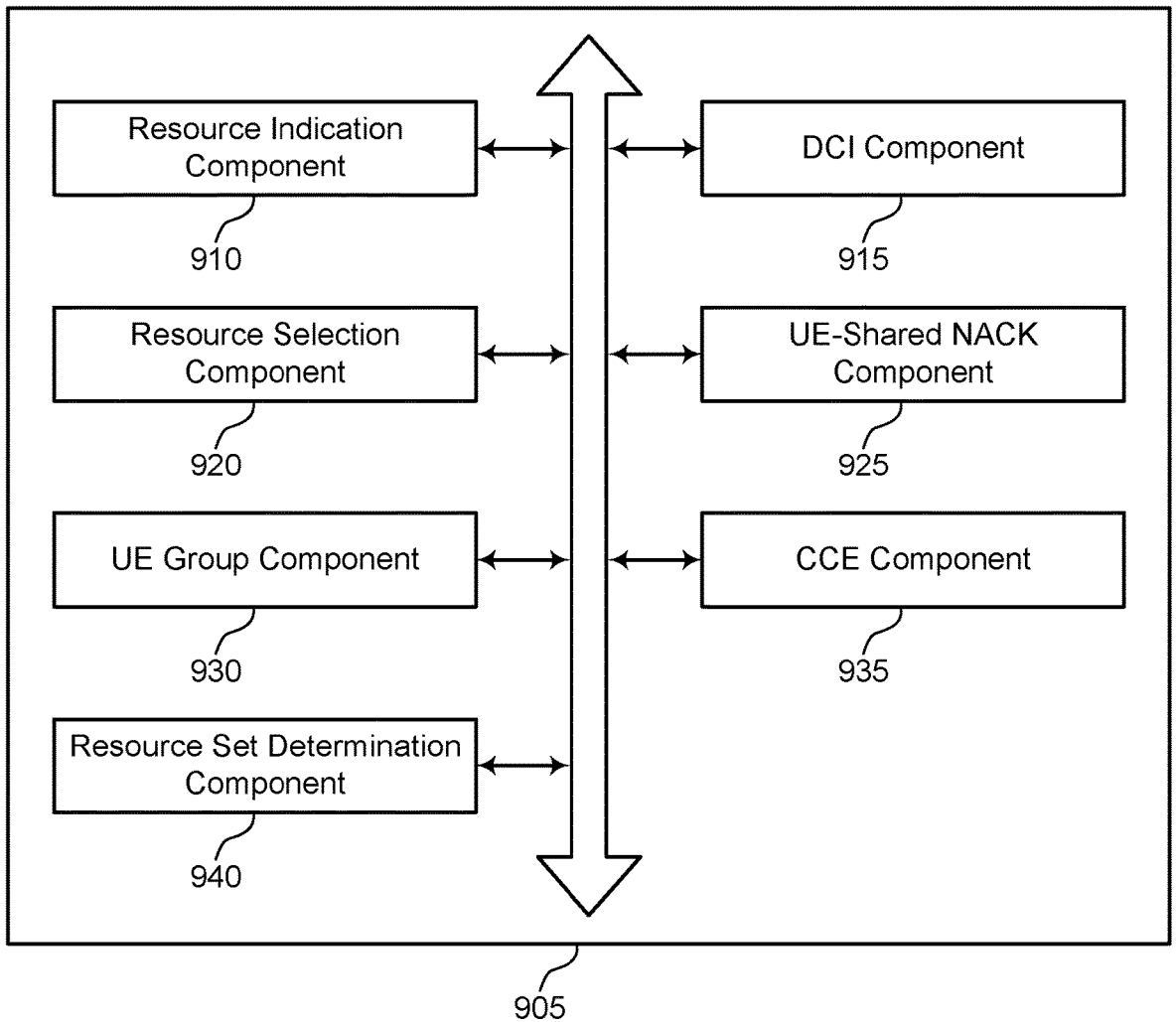
FIG. 9 shows a block diagram of a communications manager that supports resource selection for UE-shared multicast feedback in accordance with aspects of the present disclosure.

FIG. 9 shows a block diagram of a communications manager 905 that supports resource selection for UE-shared multicast feedback in accordance with aspects of the present disclosure. The communications manager 905 may be an example of aspects of a communications manager 715, a communications manager 815, or a communications manager 1010 described herein. The communications manager 905 may include a resource indication component 910, a DCI component 915, a resource selection component 920, a UE-shared NACK component 925, an UE group component 930, a CCE component 935, and a resource set determination component 940. Each of these components may communicate, directly or indirectly, with one another (for example, via one or more buses).

The resource indication component 910 may receive an indication of a set of uplink control channel resources for reporting acknowledgment feedback by the UE for multicast communications, the set of uplink control channel resources shared by a set of UEs associated with the multicast communications. In some examples, the indication of the set of uplink control channel resources is received in one or both of an RRC message or a MAC CE.

In some examples, the resource indication component 910 may receive a second indication of a second set of uplink control channel resources for reporting the acknowledgment feedback by the UE for the multicast communications, the second set of uplink control channel resources shared by the set of UEs associated with the multicast communications.

The DCI component 915 may receive a DCI message including an uplink control channel resource indicator and scheduling a multicast message.

The resource selection component 920 may determine an uplink control channel resource of the set of uplink control channel resources based on a set of communication conditions and the uplink control channel resource indicator.

In some examples, the resource selection component 920 may determine a subset of uplink control channel resources of the set of uplink control channel resources based on the set of communication conditions and the uplink control channel resource indicator. In some such examples, the resource selection component 920 may select the uplink control channel resource from the subset of uplink control channel resources based on one or more of a random selection procedure, a UE identifier, or an RNTI.

In some examples, the set of UEs corresponds to a set of UE groups. In some examples, the resource selection component 920 may determine a UE group of the set of UE groups including the UE according to the set of communication conditions. In some examples, the uplink control channel resource indicator indicates the subset of uplink control channel resources for the UE group.

In some examples, the resource selection component 920 may determine multiple UE groups of the set of UE groups including the UE according to the set of communication conditions. In some examples, the uplink control channel resource indicator indicates the subset of uplink control channel resources for the multiple UE groups.

In some examples, the set of communication conditions includes one or more of an RSSI, an RSRP, an RSRQ, an SINR, a CQI, a PMI, a path loss, a TA, a power headroom, a measurement identified based on an SSB, a measurement identified based on a CSI-RS, or a transmitter configuration identified based on an SRS.

The UE-shared NACK component 925 may transmit a NACK feedback message for the multicast message on the determined uplink control channel resource.

The UE group component 930 may determine a UE group of the set of UE groups including the UE according to the set of communication conditions. In some examples, the UE group corresponds to a subset of uplink control channel resources of the set of uplink control channel resources associated with respective uplink control channel resource indicator values.

In some examples, the UE group component 930 may determine the uplink control channel resource from the subset of uplink control channel resources according to the uplink control channel resource indicator.

The CCE component 935 may detect the DCI message in one or more CCEs of a CORESET. In some examples, the uplink channel resource is determined further based on an index of a first CCE of the one or more CCEs. Additionally or alternatively, the uplink channel resource may be determined based on a number of CCEs in the CORESET.

The resource set determination component 940 may determine to transmit the NACK feedback message in response to one or more multicast messages including the multicast message.

In some examples, the resource set determination component 940 may select the first set of uplink control channel resources for reporting the acknowledgment feedback for the multicast communications based on one or both of the one or more multicast messages or a number of multicast messages in the one or more multicast messages.

Figure 10:
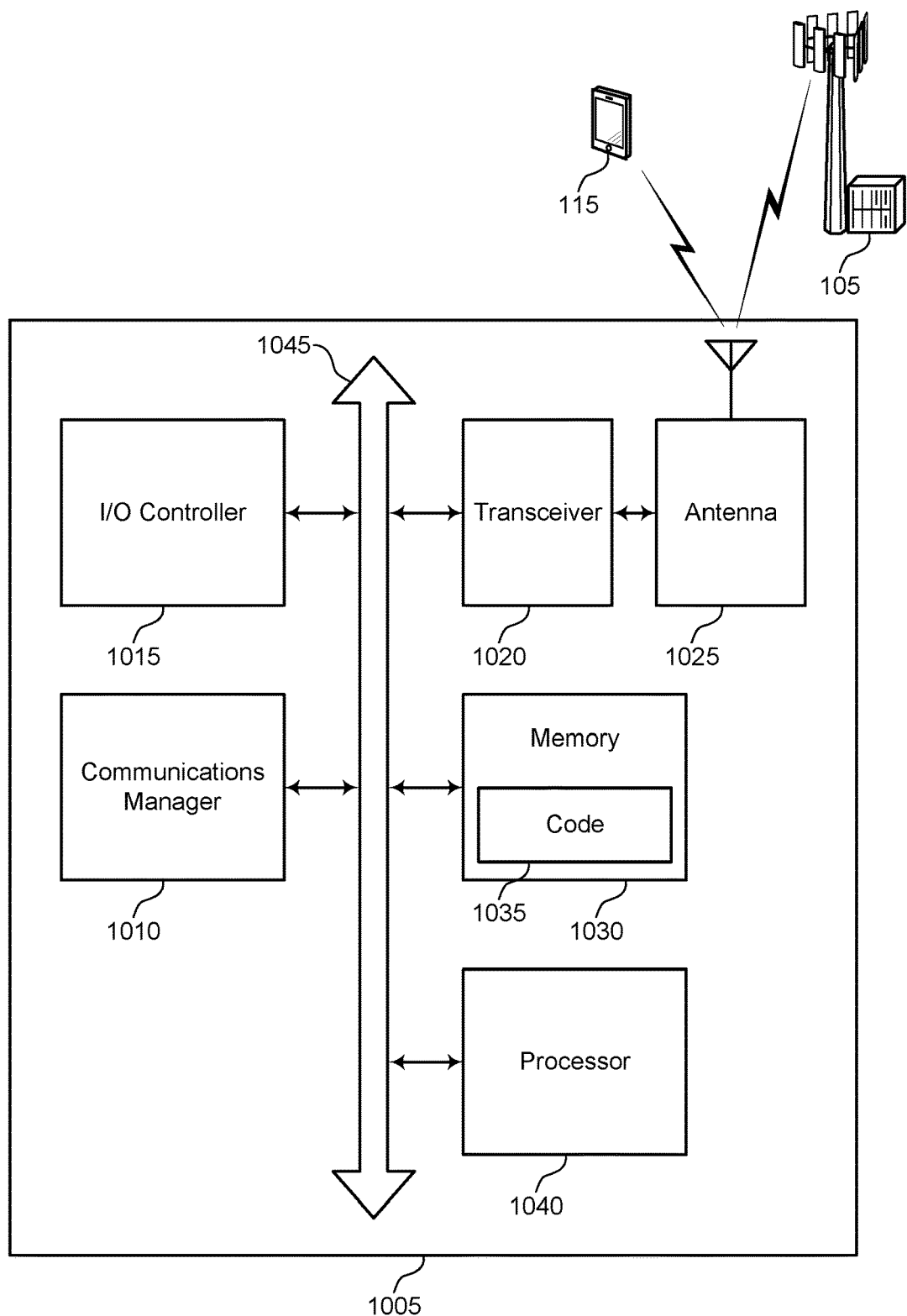
FIG. 10 shows a diagram of a system including a device that supports resource selection for UE-shared multicast feedback in accordance with aspects of the present disclosure.

FIG. 10 shows a diagram of a system including a device 1005 that supports resource selection for UE-shared multicast feedback in accordance with aspects of the present disclosure. The device 1005 may be an example of or include the components of a device 705, a device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (for example, a bus 1045).

The communications manager 1010 may receive an indication of a set of uplink control channel resources for reporting acknowledgment feedback by the UE for multicast communications, the set of uplink control channel resources shared by a set of UEs associated with the multicast communications. The communications manager 1010 may further receive a DCI message including an uplink control channel resource indicator and scheduling a multicast message, determine an uplink control channel resource of the set of uplink control channel resources based on a set of communication conditions and the uplink control channel resource indicator, and transmit a NACK feedback message for the multicast message on the determined uplink control channel resource.

The I/O controller 1015 may manage input and output signals for the device 1005. The I/O controller 1015 may also manage peripherals not integrated into the device 1005. In some examples, the I/O controller 1015 may represent a physical connection or port to an external peripheral. In some implementations, the PO controller 1015 may utilize an operating system such as iOS®, ANDROID®, MS-DOS®, MS-WINDOWS®, OS/2®, UNIX®, LINUX®, or another known operating system. In some other examples, the I/O controller 1015 may represent or interact with a modem, a keyboard, a mouse, a touchscreen, or a similar device. In some implementations, the I/O controller 1015 may be implemented as part of a processor. In some examples, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some examples, the wireless device may include a single antenna 1025. However, in some other examples, the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some implementations, the memory 1030 may contain, among other things, a basic I/O system (BIOS) which may control basic hardware or software operation such as the interaction with peripheral components or devices.

The processor 1040 may include an intelligent hardware device (for example, a general-purpose processor, a DSP, a central processing unit (CPU), a microcontroller, an ASIC, an FPGA, a programmable logic device, a discrete gate or transistor logic component, a discrete hardware component, or any combination thereof). In some examples, the processor 1040 may be configured to operate a memory array using a memory controller. In some other examples, a memory controller may be integrated into the processor 1040. The processor 1040 may be configured to execute computer-readable instructions stored in a memory (for example, the memory 1030) to cause the device 1005 to perform various functions (for example, functions or tasks supporting resource selection for UE-shared multicast feedback).

The code 1035 may include instructions to implement aspects of the present disclosure, including instructions to support wireless communications. The code 1035 may be stored in a non-transitory computer-readable medium such as system memory or other type of memory. In some examples, the code 1035 may not be directly executable by the processor 1040 but may cause a computer (for example, when compiled and executed) to perform functions described herein.

Figure 11:
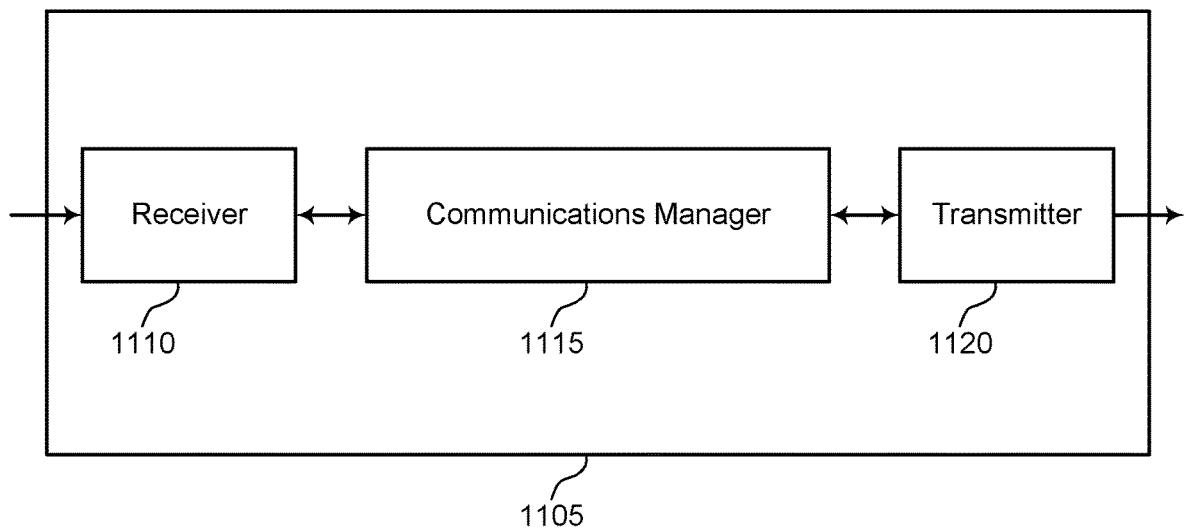
FIGS. 11 and 12 show block diagrams of devices that support resource selection for UE-shared multicast feedback in accordance with aspects of the present disclosure.

FIG. 11 shows a block diagram of a device 1105 that supports resource selection for UE-shared multicast feedback in accordance with aspects of the present disclosure. The device 1105 may be an example of aspects of a base station 105 as described herein. The device 1105 may include a receiver 1110, a communications manager 1115, and a transmitter 1120. The communications manager 1115 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to resource selection for UE-shared multicast feedback). Information may be passed on to other components of the device 1105. The receiver 1110 may be an example of aspects of the transceiver 1420 described with reference to FIG. 14. The receiver 1110 may utilize a single antenna or a set of antennas.

In some implementations, the communications manager 1115 may transmit, over one or more multicast channels, an indication of a set of uplink control channel resources for reporting acknowledgment feedback for multicast communications, the set of uplink control channel resources shared by a set of UEs associated with the multicast communications. The communications manager 1115 may further transmit a DCI message including an uplink control channel resource indicator and scheduling a multicast message, transmit, over the one or more multicast channels, the multicast message, receive, from one or more UEs of the set of UEs, one or more NACK feedback messages for the multicast message on an uplink control channel resource of the set of uplink control channel resources shared by the one or more UEs, and re-transmit, over the one or more multicast channels, the multicast message in response to the one or more NACK feedback messages using a set of transmission parameters based on the uplink control channel resource and the uplink control channel resource indicator.

Additionally or alternatively, the communications manager 1115 may determine, for a set of UEs, a first group of UEs and a second group of UEs different than the first group of UEs based on a set of communication conditions for each UE of the set of UEs, and may transmit, over one or more multicast channels, a first indication of a first uplink control channel resource for reporting acknowledgment feedback for multicast communications, the first uplink control channel resource shared by the first group of UEs associated with the multicast communications. The communications manager 1115 may further transmit, over the one or more multicast channels, a second indication of a second uplink control channel resource for reporting acknowledgment feedback for the multicast communications, the second uplink control channel resource shared by the second group of UEs associated with the multicast communications, and may transmit, over the one or more multicast channels, a multicast message. The communications manager 1115 may receive, from one or more UEs, one or more NACK feedback messages for the multicast message on the first uplink control channel resource and may re-transmit, over the one or more multicast channels, the multicast message in response to the one or more NACK feedback messages using a set of transmission parameters corresponding to the first group of UEs based on receiving the one or more NACK feedback messages on the first uplink control channel resource. The communications manager 1115 may be an example of aspects of the communications manager 1410 described herein.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
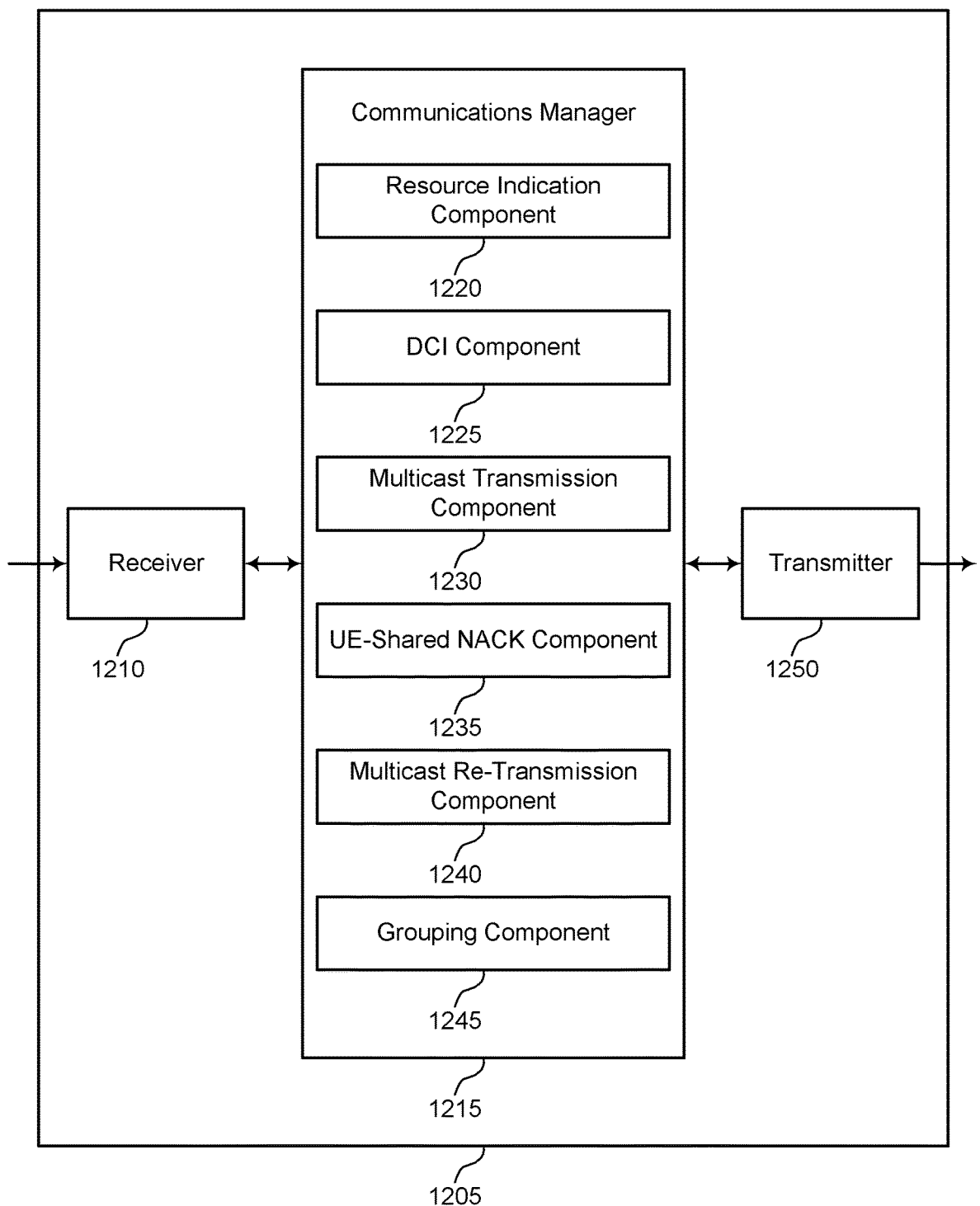

FIG. 12 shows a block diagram of a device 1205 that supports resource selection for UE-shared multicast feedback in accordance with aspects of the present disclosure. The device 1205 may be an example of aspects of a device 1105 or a base station 105 as described herein. The device 1205 may include a receiver 1210, a communications manager 1215, and a transmitter 1250. The communications manager 1215 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to resource selection for UE-shared multicast feedback). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a resource indication component 1220, a DCI component 1225, a multicast transmission component 1230, a UE-shared NACK component 1235, a multicast re-transmission component 1240, and a grouping component 1245. The communications manager 1215 may be an example of aspects of the communications manager 1410 described herein.

In some implementations, the resource indication component 1220 may transmit, over one or more multicast channels, an indication of a set of uplink control channel resources for reporting acknowledgment feedback for multicast communications, the set of uplink control channel resources shared by a set of UEs associated with the multicast communications.

The DCI component 1225 may transmit a DCI message including an uplink control channel resource indicator and scheduling a multicast message. The multicast transmission component 1230 may transmit, over the one or more multicast channels, the multicast message.

The UE-shared NACK component 1235 may receive, from one or more UEs of the set of UEs, one or more NACK feedback messages for the multicast message on an uplink control channel resource of the set of uplink control channel resources shared by the one or more UEs. The multicast re-transmission component 1240 may re-transmit, over the one or more multicast channels, the multicast message in response to the one or more NACK feedback messages using a set of transmission parameters based on the uplink control channel resource and the uplink control channel resource indicator.

Additionally or alternatively, the grouping component 1245 may determine, for a set of UEs, a first group of UEs and a second group of UEs different than the first group of UEs based on a set of communication conditions for each UE of the set of UEs.

The resource indication component 1220 may transmit, over one or more multicast channels, a first indication of a first uplink control channel resource for reporting acknowledgment feedback for multicast communications, the first uplink control channel resource shared by the first group of UEs associated with the multicast communications. The resource indication component 1220 may additionally transmit, over the one or more multicast channels, a second indication of a second uplink control channel resource for reporting acknowledgment feedback for the multicast communications, the second uplink control channel resource shared by the second group of UEs associated with the multicast communications.

The multicast transmission component 1230 may transmit, over the one or more multicast channels, a multicast message. The UE-shared NACK component 1235 may receive, from one or more UEs, one or more NACK feedback messages for the multicast message on the first uplink control channel resource.

The multicast re-transmission component 1240 may re-transmit, over the one or more multicast channels, the multicast message in response to the one or more NACK feedback messages using a set of transmission parameters corresponding to the first group of UEs based on receiving the one or more NACK feedback messages on the first uplink control channel resource.

The transmitter 1250 may transmit signals generated by other components of the device 1205. In some examples, the transmitter 1250 may be collocated with a receiver 1210 in a transceiver component. For example, the transmitter 1250 may be an example of aspects of the transceiver 1420 described with reference to FIG. 14. The transmitter 1250 may utilize a single antenna or a set of antennas.

Figure 13:
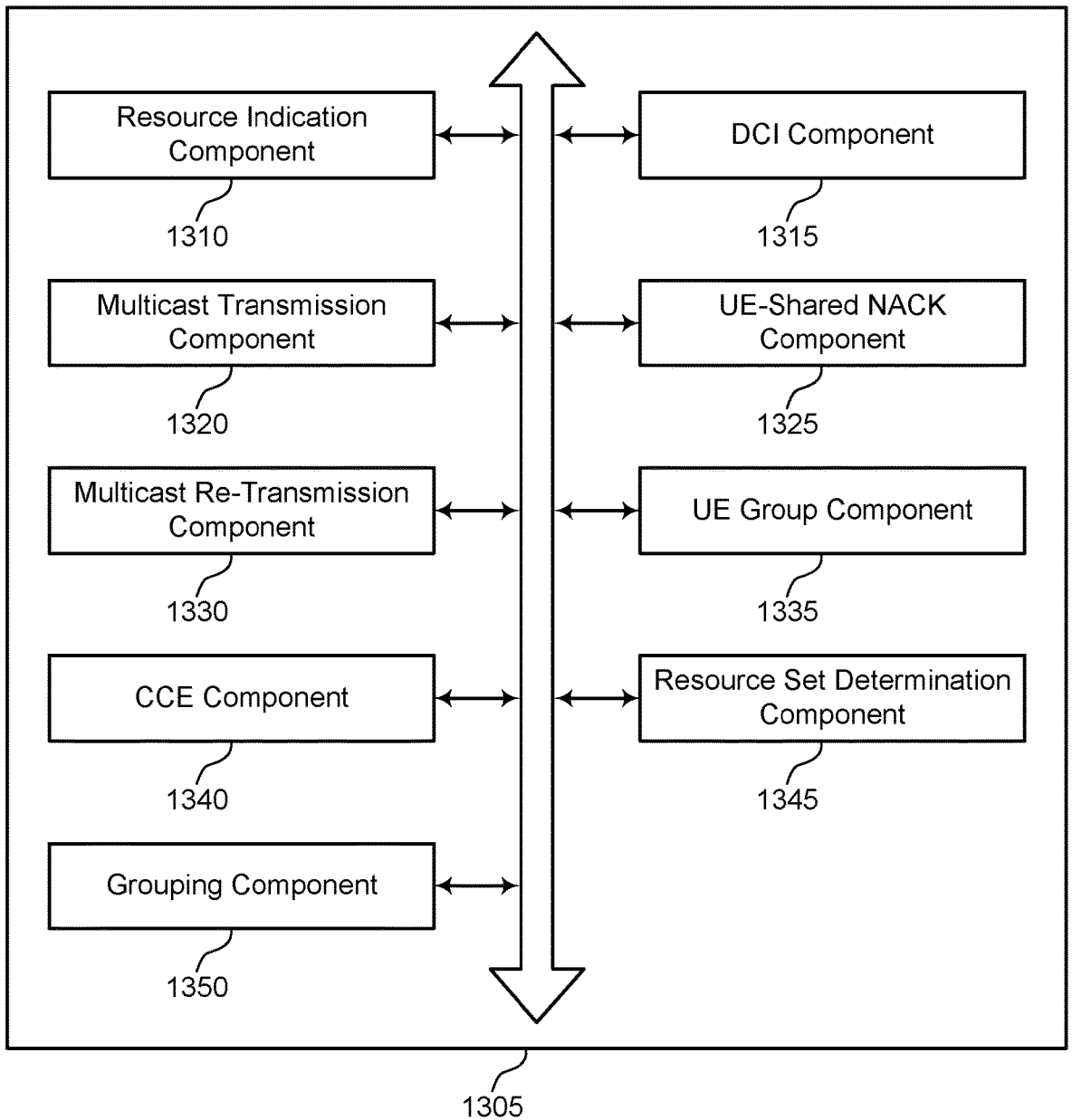
FIG. 13 shows a block diagram of a communications manager that supports resource selection for UE-shared multicast feedback in accordance with aspects of the present disclosure.

FIG. 13 shows a block diagram of a communications manager 1305 that supports resource selection for UE-shared multicast feedback in accordance with aspects of the present disclosure. The communications manager 1305 may be an example of aspects of a communications manager 1115, a communications manager 1215, or a communications manager 1410 described herein. The communications manager 1305 may include a resource indication component 1310, a DCI component 1315, a multicast transmission component 1320, a UE-shared NACK component 1325, a multicast re-transmission component 1330, a UE group component 1335, a CCE component 1340, a resource set determination component 1345, and a grouping component 1350. Each of these components may communicate, directly or indirectly, with one another (for example, via one or more buses).

The resource indication component 1310 may transmit, over one or more multicast channels, an indication of a set of uplink control channel resources for reporting acknowledgment feedback for multicast communications, the set of uplink control channel resources shared by a set of UEs associated with the multicast communications. In some examples, the indication of the set of uplink control channel resources is a first indication of a first set of uplink control channel resources and the resource indication component 1310 may transmit, over the one or more multicast channels, a second indication of a second set of uplink control channel resources for reporting the acknowledgment feedback for the multicast communications, the second set of uplink control channel resources shared by the set of UEs associated with the multicast communications. In some examples, the indication of the set of uplink control channel resources is transmitted in one or both of an RRC message or a MAC CE.

The DCI component 1315 may transmit a DCI message including an uplink control channel resource indicator and scheduling a multicast message. The multicast transmission component 1320 may transmit, over the one or more multicast channels, the multicast message.

The UE-shared NACK component 1325 may receive, from one or more UEs of the set of UEs, one or more NACK feedback messages for the multicast message on an uplink control channel resource of the set of uplink control channel resources shared by the one or more UEs.

The multicast re-transmission component 1330 may re-transmit, over the one or more multicast channels, the multicast message in response to the one or more NACK feedback messages using a set of transmission parameters based on the uplink control channel resource and the uplink control channel resource indicator. In some examples, the set of transmission parameters includes one or more of an MCS, a pre-coding matrix, or a transmission beam.

In some examples, the set of UEs corresponds to a set of UE groups. The UE group component 1335 may determine a UE group of the set of UE groups including the one or more UEs according to the uplink control channel resource and the uplink control channel resource indicator. In some examples, the UE group component 1335 may determine the set of transmission parameters based on the determined UE group.

In some examples, the DCI message may be transmitted in one or more CCEs of a CORESET. The CCE component 1340 may determine the set of transmission parameters based on the uplink control channel resource, the uplink control channel resource indicator, and a first CCE of the one or more CCEs. In some examples, the set of transmission parameters may be determined further based on a number of CCEs in the CORESET.

In some examples, the multicast re-transmission component 1330 may determine one or more multicast messages for re-transmission based on the uplink control channel resource and the uplink control channel resource indicator, the one or more multicast messages for re-transmission including the multicast message.

The resource set determination component 1345 may determine that the first set of uplink control channel resources includes the uplink control channel resource. In some examples, one or both of the one or more multicast messages for re-transmission or a number of multicast messages in the one or more multicast messages is determined based on the determination that the first set of uplink control channel resources includes the uplink control channel resource.

The grouping component 1350 may determine, for a set of UEs, a first group of UEs and a second group of UEs different than the first group of UEs based on a set of communication conditions for each UE of the set of UEs.

The resource indication component 1310 may transmit, over one or more multicast channels, a first indication of a first uplink control channel resource for reporting acknowledgment feedback for multicast communications, the first uplink control channel resource shared by the first group of UEs associated with the multicast communications. In some examples, the resource indication component 1310 may transmit, over the one or more multicast channels, a second indication of a second uplink control channel resource for reporting acknowledgment feedback for the multicast communications, the second uplink control channel resource shared by the second group of UEs associated with the multicast communications. In some implementations, the first indication indicates a first set of uplink control channel resources including the first uplink control channel resource, the second indication indicates a second set of uplink control channel resources including the second uplink control channel resource, or both. In some implementations, one or both of the first indication of the first uplink control channel resource or the second indication of the second uplink control channel resource are transmitted in one or both of an RRC message or a MAC CE.

The multicast transmission component 1320 may transmit, over the one or more multicast channels, a multicast message. The UE-shared NACK component 1325 may receive, from one or more UEs, one or more NACK feedback messages for the multicast message on the first uplink control channel resource.

The multicast re-transmission component 1330 may re-transmit, over the one or more multicast channels, the multicast message in response to the one or more NACK feedback messages using a set of transmission parameters corresponding to the first group of UEs based on receiving the one or more NACK feedback messages on the first uplink control channel resource. In some examples, the set of transmission parameters includes one or more of an MCS, a pre-coding matrix, or a transmission beam.

In some examples, the DCI component 1315 may transmit a DCI message including an uplink control channel resource indicator and scheduling the multicast message. The UE-shared NACK component 1325 may determine that the one or more UEs correspond to the first group of UEs based on the uplink control channel resource indicator and receiving the one or more NACK feedback messages on the first uplink control channel resource.

In some examples, the set of communication conditions includes one or more of an RSSI, an RSRP, an RSRQ, an SINR, a CQI, a PMI, a path loss, a TA, a power headroom, a measurement identified based on an SSB, a measurement identified based on a CSI-RS, or a transmitter configuration identified based on an SRS.

Figure 14:
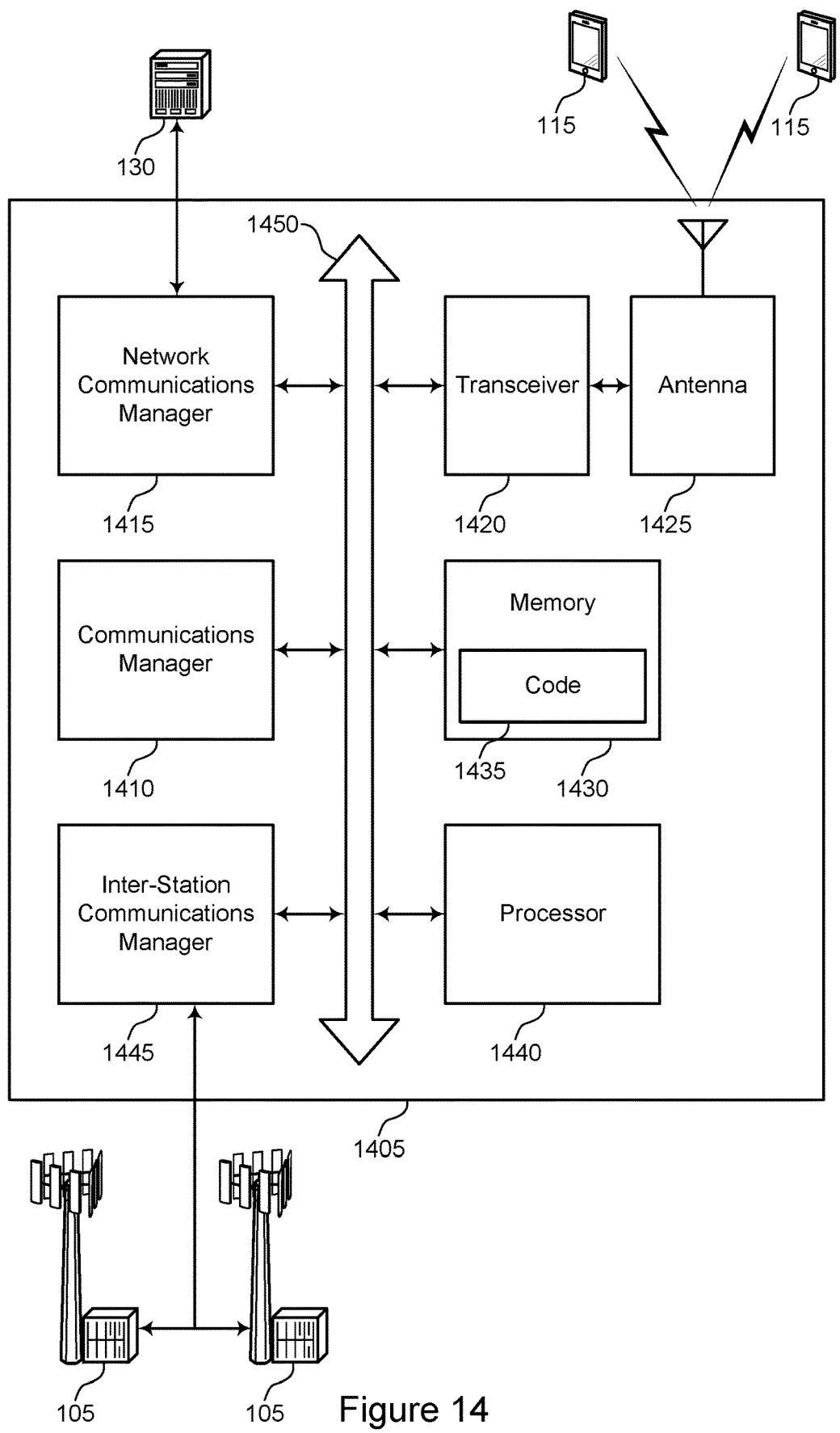
FIG. 14 shows a diagram of a system including a device that supports resource selection for UE-shared multicast feedback in accordance with aspects of the present disclosure.

FIG. 14 shows a diagram of a system including a device 1405 that supports resource selection for UE-shared multicast feedback in accordance with aspects of the present disclosure. The device 1405 may be an example of or include the components of a device 1105, a device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (for example, a bus 1450).

In some implementations, the communications manager 1410 may transmit, over one or more multicast channels, an indication of a set of uplink control channel resources for reporting acknowledgment feedback for multicast communications, the set of uplink control channel resources shared by a set of UEs associated with the multicast communications. The communications manager 1410 may transmit a DCI message including an uplink control channel resource indicator and scheduling a multicast message, transmit, over the one or more multicast channels, the multicast message, receive, from one or more UEs of the set of UEs, one or more NACK feedback messages for the multicast message on an uplink control channel resource of the set of uplink control channel resources shared by the one or more UEs, and re-transmit, over the one or more multicast channels, the multicast message in response to the one or more NACK feedback messages using a set of transmission parameters based on the uplink control channel resource and the uplink control channel resource indicator.

Additionally or alternatively, the communications manager 1410 may also determine, for a set of UEs, a first group of UEs and a second group of UEs different than the first group of UEs based on a set of communication conditions for each UE of the set of UEs, transmit, over one or more multicast channels, a first indication of a first uplink control channel resource for reporting acknowledgment feedback for multicast communications, the first uplink control channel resource shared by the first group of UEs associated with the multicast communications, and transmit, over the one or more multicast channels, a second indication of a second uplink control channel resource for reporting acknowledgment feedback for the multicast communications, the second uplink control channel resource shared by the second group of UEs associated with the multicast communications. The communications manager 1410 may transmit, over the one or more multicast channels, a multicast message, receive, from one or more UEs, one or more NACK feedback messages for the multicast message on the first uplink control channel resource, and re-transmit, over the one or more multicast channels, the multicast message in response to the one or more NACK feedback messages using a set of transmission parameters corresponding to the first group of UEs based on receiving the one or more NACK feedback messages on the first uplink control channel resource.

The network communications manager 1415 may manage communications with the core network 130 (for example, via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some examples, the wireless device may include a single antenna 1425. However, in some other examples, the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (for example, the processor 1440) cause the device to perform various functions described herein. In some implementations, the memory 1430 may contain, among other things, a BIOS which may control basic hardware or software operation such as the interaction with peripheral components or devices.

The processor 1440 may include an intelligent hardware device (for example, a general-purpose processor, a DSP, a CPU, a microcontroller, an ASIC, an FPGA, a programmable logic device, a discrete gate or transistor logic component, a discrete hardware component, or any combination thereof). In some examples, the processor 1440 may be configured to operate a memory array using a memory controller. In some implementations, a memory controller may be integrated into processor 1440. The processor 1440 may be configured to execute computer-readable instructions stored in a memory (for example, the memory 1430) to cause the device 1405 to perform various functions (for example, functions or tasks supporting resource selection for UE-shared multicast feedback).

The inter-station communications manager 1445 may manage communications with other base stations 105 and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some examples, the code 1435 may not be directly executable by the processor 1440 but may cause a computer (for example, when compiled and executed) to perform functions described herein.

Figure 15:
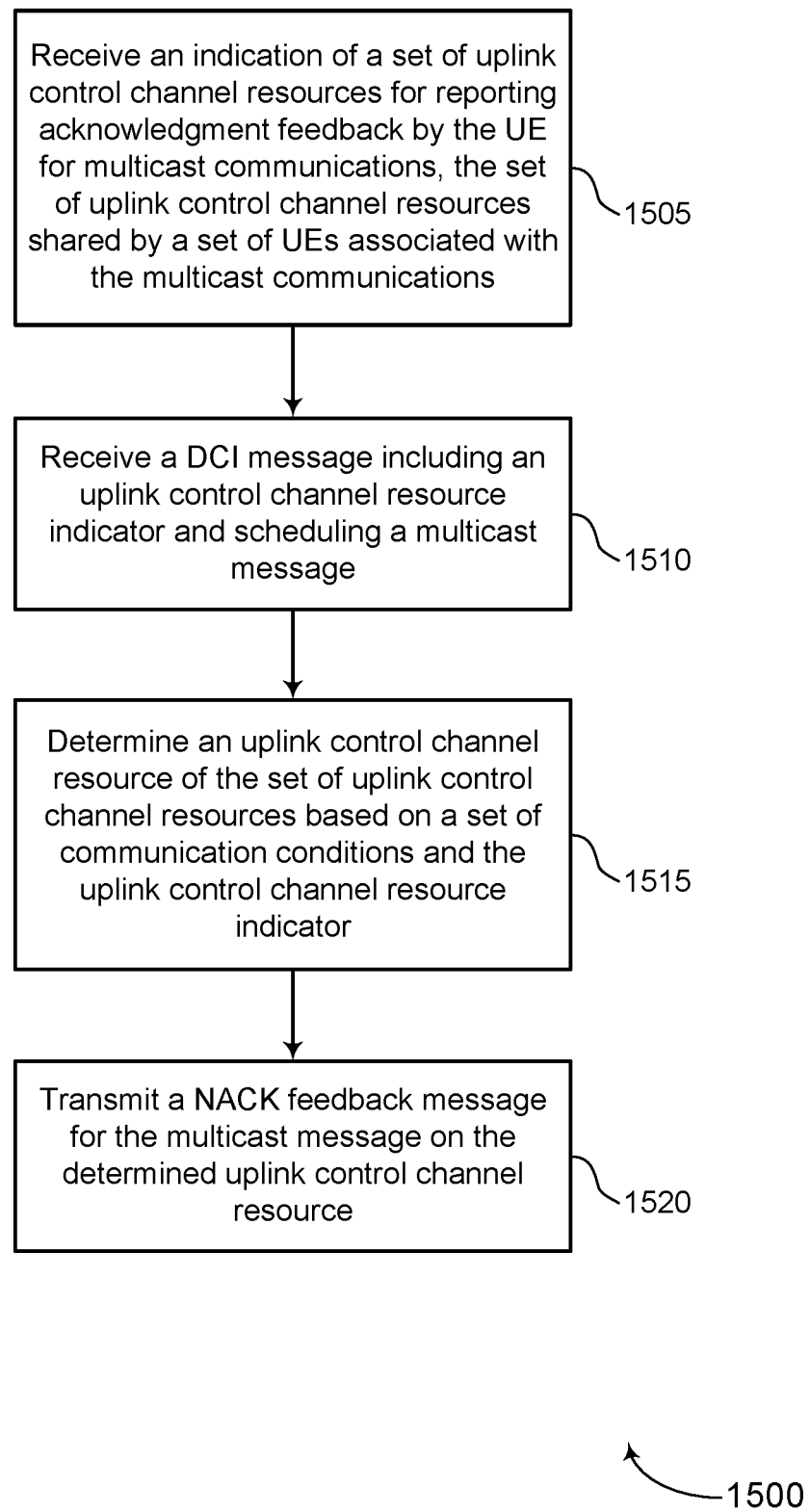
FIGS. 15-19 show flowcharts illustrating methods that support resource selection for UE-shared multicast feedback in accordance with aspects of the present disclosure.

FIG. 15 shows a flowchart illustrating a method 1500 that supports resource selection for UE-shared multicast feedback in accordance with aspects of the present disclosure. The operations of the method 1500 may be implemented by a UE 115 or its components as described herein. For example, the operations of the method 1500 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1505, the UE may receive an indication of a set of uplink control channel resources for reporting acknowledgment feedback by the UE for multicast communications, the set of uplink control channel resources shared by a set of UEs associated with the multicast communications. The operations of 1505 may be performed according to the methods described herein. In some examples, aspects of the operations of 1505 may be performed by a resource indication component as described with reference to FIGS. 7-10.

At 1510, the UE may receive a DCI message including an uplink control channel resource indicator and scheduling a multicast message. The operations of 1510 may be performed according to the methods described herein. In some examples, aspects of the operations of 1510 may be performed by a DCI component as described with reference to FIGS. 7-10.

At 1515, the UE may determine an uplink control channel resource of the set of uplink control channel resources based on a set of communication conditions and the uplink control channel resource indicator. The operations of 1515 may be performed according to the methods described herein. In some examples, aspects of the operations of 1515 may be performed by a resource selection component as described with reference to FIGS. 7-10.

At 1520, the UE may transmit a NACK feedback message for the multicast message on the determined uplink control channel resource. The operations of 1520 may be performed according to the methods described herein. In some examples, aspects of the operations of 1520 may be performed by a UE-shared NACK component as described with reference to FIGS. 7-10.

Figure 16:
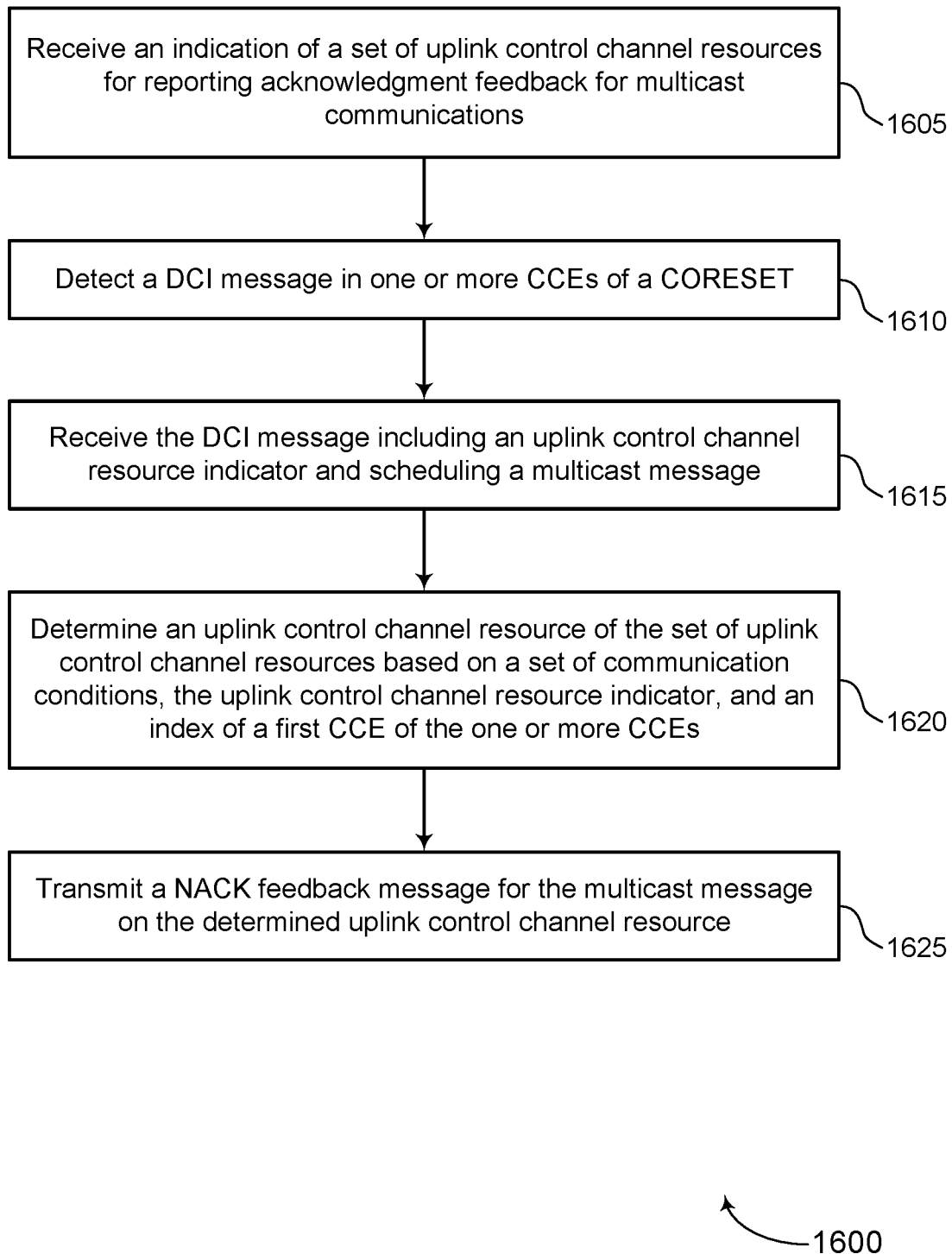

FIG. 16 shows a flowchart illustrating a method 1600 that supports resource selection for UE-shared multicast feedback in accordance with aspects of the present disclosure. The operations of the method 1600 may be implemented by a UE 115 or its components as described herein. For example, the operations of the method 1600 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1605, the UE may receive an indication of a set of uplink control channel resources for reporting acknowledgment feedback by the UE for multicast communications, the set of uplink control channel resources shared by a set of UEs associated with the multicast communications. The operations of 1605 may be performed according to the methods described herein. In some examples, aspects of the operations of 1605 may be performed by a resource indication component as described with reference to FIGS. 7-10.

At 1610, the UE may detect a DCI message in one or more CCEs of a CORESET. In some examples, the uplink channel resource is determined further based on an index of a first control channel element of the one or more control channel elements. The operations of 1610 may be performed according to the methods described herein. In some examples, aspects of the operations of 1610 may be performed by a CCE component as described with reference to FIGS. 7-10.

At 1615, the UE may receive the DCI message including an uplink control channel resource indicator and scheduling a multicast message. The operations of 1615 may be performed according to the methods described herein. In some examples, aspects of the operations of 1615 may be performed by a DCI component as described with reference to FIGS. 7-10.

At 1620, the UE may determine an uplink control channel resource of the set of uplink control channel resources based on a set of communication conditions, the uplink control channel resource indicator, and an index of a first CCE of the one or more CCEs. The operations of 1620 may be performed according to the methods described herein. In some examples, aspects of the operations of 1620 may be performed by a resource selection component as described with reference to FIGS. 7-10.

At 1625, the UE may transmit a NACK feedback message for the multicast message on the determined uplink control channel resource. The operations of 1625 may be performed according to the methods described herein. In some examples, aspects of the operations of 1625 may be performed by a UE-shared NACK component as described with reference to FIGS. 7-10.

Figure 17:
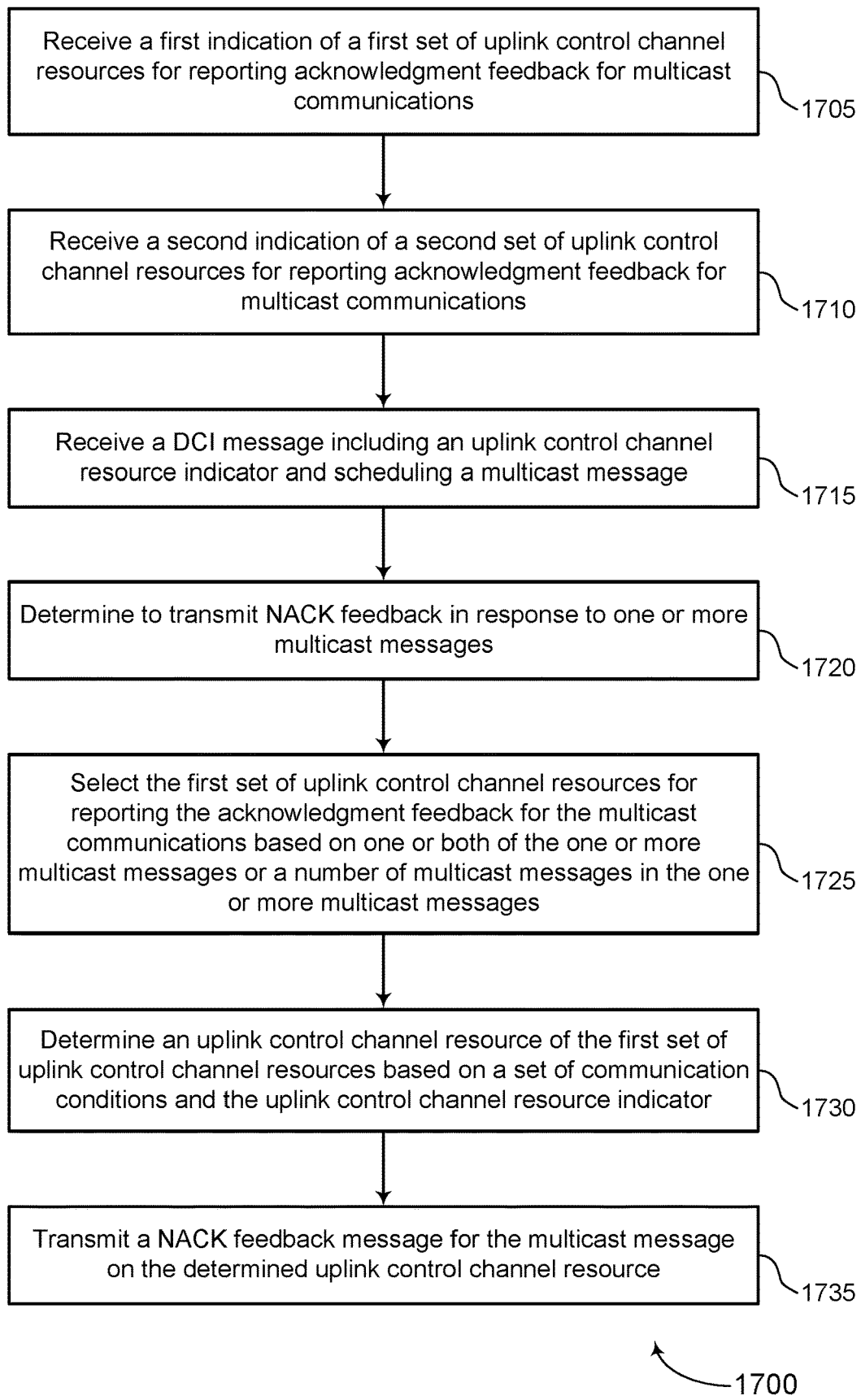

FIG. 17 shows a flowchart illustrating a method 1700 that supports resource selection for UE-shared multicast feedback in accordance with aspects of the present disclosure. The operations of the method 1700 may be implemented by a UE 115 or its components as described herein. For example, the operations of the method 1700 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1705, the UE may receive a first indication of a first set of uplink control channel resources for reporting acknowledgment feedback by the UE for multicast communications, the set of uplink control channel resources shared by a set of UEs associated with the multicast communications. The operations of 1705 may be performed according to the methods described herein. In some examples, aspects of the operations of 1705 may be performed by a resource indication component as described with reference to FIGS. 7-10.

At 1710, the UE may receive a second indication of a second set of uplink control channel resources for reporting the acknowledgment feedback by the UE for the multicast communications, the second set of uplink control channel resources shared by the set of UEs associated with the multicast communications. The operations of 1710 may be performed according to the methods described herein. In some examples, aspects of the operations of 1710 may be performed by a resource indication component as described with reference to FIGS. 7-10.

At 1715, the UE may receive a DCI message including an uplink control channel resource indicator and scheduling a multicast message. The operations of 1715 may be performed according to the methods described herein. In some examples, aspects of the operations of 1715 may be performed by a DCI component as described with reference to FIGS. 7-10.

At 1720, the UE may determine to transmit the NACK feedback message in response to one or more multicast messages including the multicast message. The operations of 1720 may be performed according to the methods described herein. In some examples, aspects of the operations of 1720 may be performed by a resource set determination component as described with reference to FIGS. 7-10.

At 1725, the UE may select the first set of uplink control channel resources for reporting the acknowledgment feedback for the multicast communications based on one or both of the one or more multicast messages or a number of multicast messages in the one or more multicast messages. The operations of 1725 may be performed according to the methods described herein. In some aspects of the operations of 1725 may be performed by a resource set determination component as described with reference to FIGS. 7-10.

At 1730, the UE may determine an uplink control channel resource of the first set of uplink control channel resources based on a set of communication conditions and the uplink control channel resource indicator. The operations of 1730 may be performed according to the methods described herein. In some examples, aspects of the operations of 1730 may be performed by a resource selection component as described with reference to FIGS. 7-10.

At 1735, the UE may transmit a NACK feedback message for the multicast message on the determined uplink control channel resource. The operations of 1735 may be performed according to the methods described herein. In some examples, aspects of the operations of 1735 may be performed by a UE-shared NACK component as described with reference to FIGS. 7-10.

Figure 18:
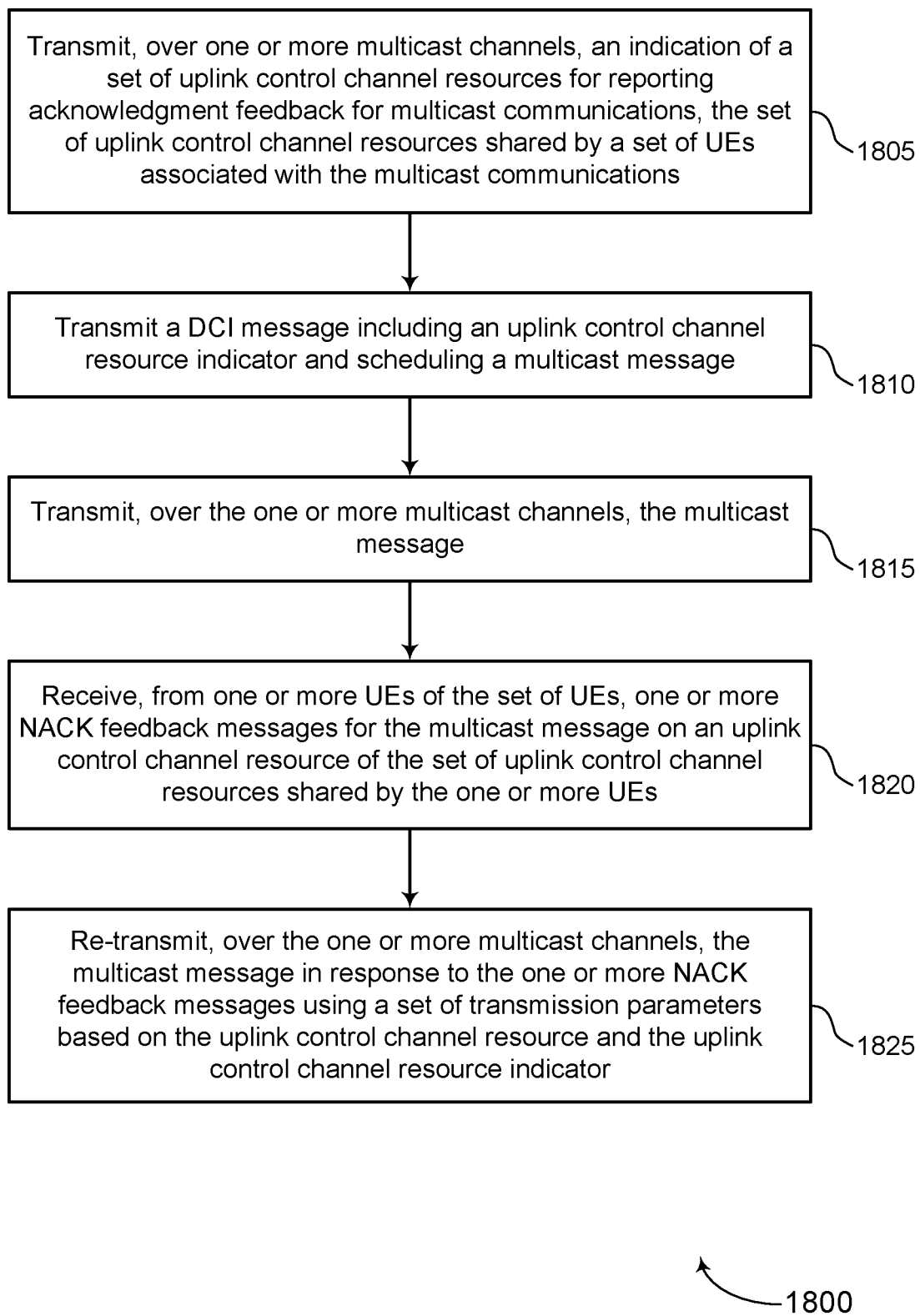

FIG. 18 shows a flowchart illustrating a method 1800 that supports resource selection for UE-shared multicast feedback in accordance with aspects of the present disclosure. The operations of the method 1800 may be implemented by a base station 105 or its components as described herein. For example, the operations of the method 1800 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 1805, the base station may transmit, over one or more multicast channels, an indication of a set of uplink control channel resources for reporting acknowledgment feedback for multicast communications, the set of uplink control channel resources shared by a set of UEs associated with the multicast communications. The operations of 1805 may be performed according to the methods described herein. In some examples, aspects of the operations of 1805 may be performed by a resource indication component as described with reference to FIGS. 11-14.

At 1810, the base station may transmit a DCI message including an uplink control channel resource indicator and scheduling a multicast message. The operations of 1810 may be performed according to the methods described herein. In some examples, aspects of the operations of 1810 may be performed by a DCI component as described with reference to FIGS. 11-14.

At 1815, the base station may transmit, over the one or more multicast channels, the multicast message. The operations of 1815 may be performed according to the methods described herein. In some examples, aspects of the operations of 1815 may be performed by a multicast transmission component as described with reference to FIGS. 11-14.

At 1820, the base station may receive, from one or more UEs of the set of UEs, one or more NACK feedback messages for the multicast message on an uplink control channel resource of the set of uplink control channel resources shared by the one or more UEs. The operations of 1820 may be performed according to the methods described herein. In some examples, aspects of the operations of 1820 may be performed by a UE-shared NACK component as described with reference to FIGS. 11-14.

At 1825, the base station may re-transmit, over the one or more multicast channels, the multicast message in response to the one or more NACK feedback messages using a set of transmission parameters based on the uplink control channel resource and the uplink control channel resource indicator. The operations of 1825 may be performed according to the methods described herein. In some examples, aspects of the operations of 1825 may be performed by a multicast re-transmission component as described with reference to FIGS. 11-14.

Figure 19:
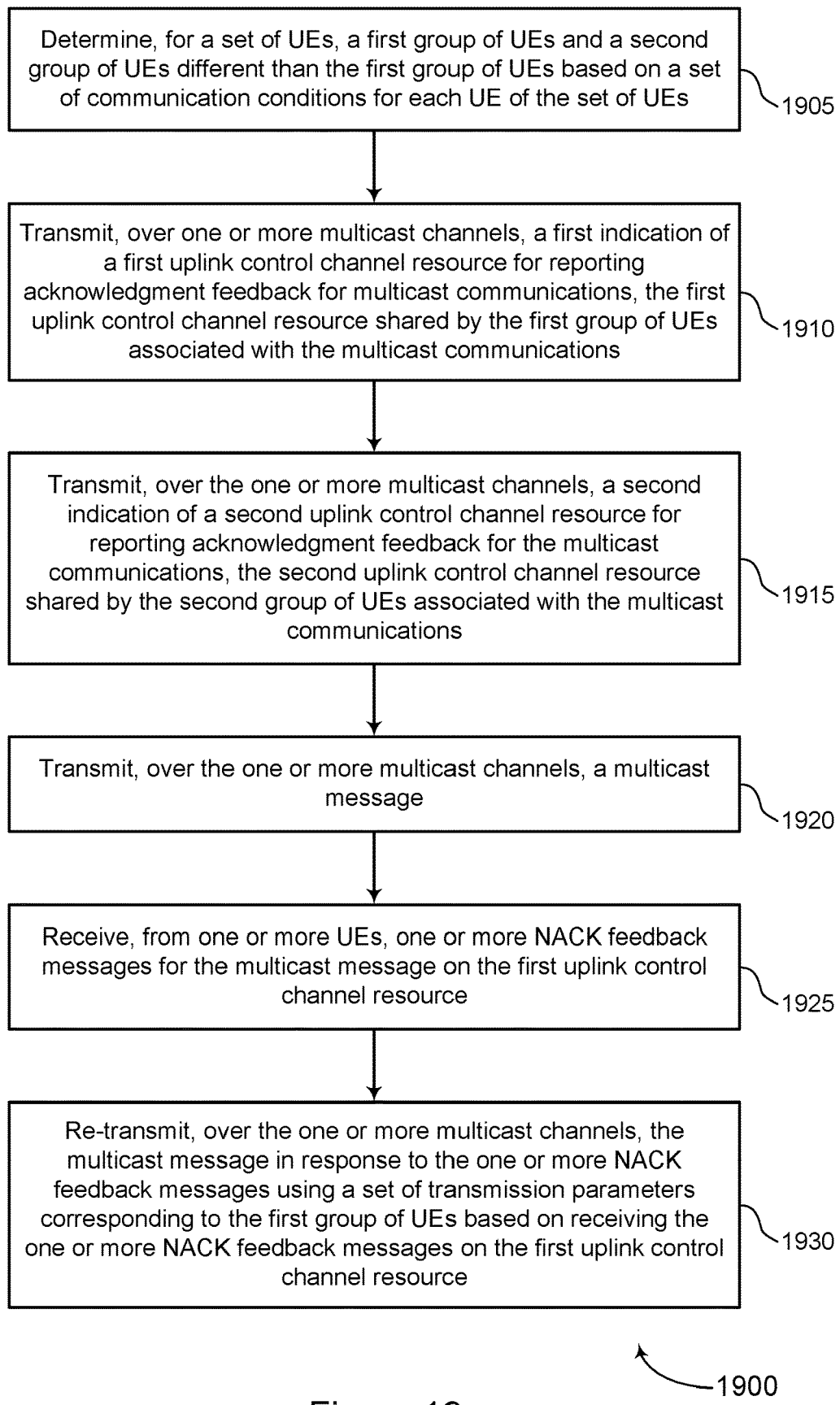

FIG. 19 shows a flowchart illustrating a method 1900 that supports resource selection for UE-shared multicast feedback in accordance with aspects of the present disclosure. The operations of the method 1900 may be implemented by a base station 105 or its components as described herein. For example, the operations of the method 1900 may be performed by a communications manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 1905, the base station may determine, for a set of UEs, a first group of UEs and a second group of UEs different than the first group of UEs based on a set of communication conditions for each UE of the set of UEs. The operations of 1905 may be performed according to the methods described herein. In some examples, aspects of the operations of 1905 may be performed by a grouping component as described with reference to FIGS. 11-14.

At 1910, the base station may transmit, over one or more multicast channels, a first indication of a first uplink control channel resource for reporting acknowledgment feedback for multicast communications, the first uplink control channel resource shared by the first group of UEs associated with the multicast communications. The operations of 1910 may be performed according to the methods described herein. In some examples, aspects of the operations of 1910 may be performed by a resource indication component as described with reference to FIGS. 11-14.

At 1915, the base station may transmit, over the one or more multicast channels, a second indication of a second uplink control channel resource for reporting acknowledgment feedback for the multicast communications, the second uplink control channel resource shared by the second group of UEs associated with the multicast communications. The operations of 1915 may be performed according to the methods described herein. In some examples, aspects of the operations of 1915 may be performed by a resource indication component as described with reference to FIGS. 11-14.

At 1920, the base station may transmit, over the one or more multicast channels, a multicast message. The operations of 1920 may be performed according to the methods described herein. In some examples, aspects of the operations of 1920 may be performed by a multicast transmission component as described with reference to FIGS. 11-14.

At 1925, the base station may receive, from one or more UEs, one or more NACK feedback messages for the multicast message on the first uplink control channel resource. The operations of 1925 may be performed according to the methods described herein. In some examples, aspects of the operations of 1925 may be performed by a UE-shared NACK component as described with reference to FIGS. 11-14.

At 1930, the base station may re-transmit, over the one or more multicast channels, the multicast message in response to the one or more NACK feedback messages using a set of transmission parameters corresponding to the first group of UEs based on receiving the one or more NACK feedback messages on the first uplink control channel resource. The operations of 1930 may be performed according to the methods described herein. In some examples, aspects of the operations of 1930 may be performed by a multicast re-transmission component as described with reference to FIGS. 11-14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   receiving an indication of a plurality of uplink control channel resources for reporting acknowledgment feedback by the UE for multicast communications, the plurality of uplink control channel resources shared by a plurality of UEs associated with the multicast communications;
   receiving a downlink control information message comprising an uplink control channel resource indicator and scheduling a multicast message;
   determining an uplink control channel resource of the plurality of uplink control channel resources based at least in part on a set of communication conditions and the uplink control channel resource indicator, wherein the set of communication conditions comprises one or more of a received signal strength indicator, a reference signal received power, a reference signal received quality, a signal-to-noise and interference power ratio, a channel quality indicator, a pre-coding matrix indicator, a path loss, a timing advance, a power headroom, a measurement identified based at least in part on a synchronization signal block, a measurement identified based at least in part on a channel state information reference signal, or a transmitter configuration identified based at least in part on a sounding reference signal; and
   transmitting a negative acknowledgment feedback message for the multicast message on the determined uplink control channel resource.

2. The method of claim 1, wherein determining the uplink control channel resource further comprises:
   determining a subset of uplink control channel resources of the plurality of uplink control channel resources based at least in part on the set of communication conditions and the uplink control channel resource indicator; and
   selecting the uplink control channel resource from the subset of uplink control channel resources based at least in part on one or more of a random selection procedure, a UE identifier, or a radio network temporary identifier.

3. The method of claim 2, wherein the plurality of UEs corresponds to a plurality of UE groups, the method further comprising determining a UE group of the plurality of UE groups comprising the UE according to the set of communication conditions, wherein the uplink control channel resource indicator indicates the subset of uplink control channel resources for the UE group.

4. The method of claim 2, wherein the plurality of UEs corresponds to a plurality of UE groups, the method further comprising determining multiple UE groups of the plurality of UE groups comprising the UE according to the set of communication conditions, wherein the uplink control channel resource indicator indicates the subset of uplink control channel resources for the multiple UE groups.

5. The method of claim 1, wherein the plurality of UEs corresponds to a plurality of UE groups and determining the uplink control channel resource further comprises:
   determining a UE group of the plurality of UE groups comprising the UE according to the set of communication conditions, wherein the UE group corresponds to a subset of uplink control channel resources of the plurality of uplink control channel resources associated with respective uplink control channel resource indicator values; and determining the uplink control channel resource from the subset of uplink control channel resources according to the uplink control channel resource indicator.

6. The method of claim 1, further comprising detecting the downlink control information message in one or more control channel elements of a control resource set, wherein the uplink channel resource is determined further based at least in part on an index of a first control channel element of the one or more control channel elements.

7. The method of claim 6, wherein the uplink channel resource is determined further based at least in part on a number of control channel elements in the control resource set.

8. The method of claim 1, wherein the indication of the plurality of uplink control channel resources comprises a first indication of a first plurality of uplink control channel resources, the method further comprising:
receiving a second indication of a second plurality of uplink control channel resources for reporting the acknowledgment feedback by the UE for the multicast communications, the second plurality of uplink control channel resources shared by the plurality of UEs associated with the multicast communications;
determining to transmit the negative acknowledgment feedback message in response to one or more multicast messages comprising the multicast message; and
selecting the first plurality of uplink control channel resources for reporting the acknowledgment feedback for the multicast communications based at least in part on one or both of the one or more multicast messages or a number of multicast messages in the one or more multicast messages.

9. The method of claim 1, wherein the indication of the plurality of uplink control channel resources is received in one or both of a radio resource control message or a medium access control control element.

10. A method for wireless communications at a base station, comprising:
transmitting, over one or more multicast channels, an indication of a plurality of uplink control channel resources for reporting acknowledgment feedback for multicast communications, the plurality of uplink control channel resources shared by a plurality of user equipments (UEs) associated with the multicast communications;
transmitting a downlink control information message comprising an uplink control channel resource indicator and scheduling a multicast message;
transmitting, over the one or more multicast channels, the multicast message;
receiving, from one or more UEs of the plurality of UEs, one or more negative acknowledgment feedback messages for the multicast message on an uplink control channel resource of the plurality of uplink control channel resources shared by the one or more UEs, wherein the uplink control channel resource is based on the uplink control channel resource indicator and a set of communication conditions, the set of communication conditions comprising one or more of a received signal strength indicator, a reference signal received power, a reference signal received quality, a signal-to-noise and interference power ratio, a channel quality indicator, a pre-coding matrix indicator, a path loss, a timing advance, a power headroom, a measurement identified based at least in part on a synchronization signal block, a measurement identified based at least in part on a channel state information reference signal, or a transmitter configuration identified based at least in part on a sounding reference signal; and
re-transmitting, over the one or more multicast channels, the multicast message in response to the one or more negative acknowledgment feedback messages using a set of transmission parameters based at least in part on the uplink control channel resource and the uplink control channel resource indicator.

11. The method of claim 10, wherein the plurality of UEs corresponds to a plurality of UE groups, the method further comprising:
determining a UE group of the plurality of UE groups comprising the one or more UEs according to the uplink control channel resource and the uplink control channel resource indicator; and
determining the set of transmission parameters based at least in part on the determined UE group.

12. The method of claim 10, wherein the downlink control information message is transmitted in one or more control channel elements of a control resource set, the method further comprising determining the set of transmission parameters based at least in part on the uplink control channel resource, the uplink control channel resource indicator, and a first control channel element of the one or more control channel elements.

13. The method of claim 12, wherein the set of transmission parameters is determined further based at least in part on a number of control channel elements in the control resource set.

14. The method of claim 10, further comprising determining one or more multicast messages for re-transmission based at least in part on the uplink control channel resource and the uplink control channel resource indicator, the one or more multicast messages for re-transmission comprising the multicast message.

15. The method of claim 14, wherein the indication of the plurality of uplink control channel resources comprises a first indication of a first plurality of uplink control channel resources, the method further comprising:
transmitting, over the one or more multicast channels, a second indication of a second plurality of uplink control channel resources for reporting the acknowledgment feedback for the multicast communications, the second plurality of uplink control channel resources shared by the plurality of UEs associated with the multicast communications; and
determining that the first plurality of uplink control channel resources comprises the uplink control channel resource, wherein one or both of the one or more multicast messages for re-transmission or a number of multicast messages in the one or more multicast messages is determined based at least in part on the determination that the first plurality of uplink control channel resources comprises the uplink control channel resource.

16. The method of claim 10, wherein the indication of the plurality of uplink control channel resources is transmitted in one or both of a radio resource control message or a medium access control control element.

17. The method of claim 10, wherein the set of transmission parameters comprises one or more of a modulation and coding scheme, a pre-coding matrix, or a transmission beam.

18. A method for wireless communications at a base station, comprising:
determining, for a plurality of user equipments (UEs), a first group of UEs and a second group of UEs different than the first group of UEs based at least in part on a set of communication conditions for each UE of the plurality of UEs, wherein the set of communication conditions comprises one or more of a received signal strength indicator, a reference signal received power, a reference signal received quality, a signal-to-noise and interference power ratio, a channel quality indicator, a pre-coding matrix indicator, a path loss, a timing advance, a power headroom, a measurement identified based at least in part on a synchronization signal block, a measurement identified based at least in part on a channel state information reference signal, or a transmitter configuration identified based at least in part on a sounding reference signal;

transmitting, over one or more multicast channels, a first indication of a first uplink control channel resource for reporting acknowledgment feedback for multicast communications, the first uplink control channel resource shared by the first group of UEs associated with the multicast communications;

transmitting, over the one or more multicast channels, a second indication of a second uplink control channel resource for reporting acknowledgment feedback for the multicast communications, the second uplink control channel resource shared by the second group of UEs associated with the multicast communications;

transmitting, over the one or more multicast channels, a multicast message;

receiving, from one or more UEs, one or more negative acknowledgment feedback messages for the multicast message on the first uplink control channel resource; and re-transmitting, over the one or more multicast channels, the multicast message in response to the one or more negative acknowledgment feedback messages using a set of transmission parameters corresponding to the first group of UEs based at least in part on receiving the one or more negative acknowledgment feedback messages on the first uplink control channel resource.

19. The method of claim 18, wherein:
the first indication indicates a first plurality of uplink control channel resources comprising the first uplink control channel resource; and
the second indication indicates a second plurality of uplink control channel resources comprising the second uplink control channel resource.

20. The method of claim 19, further comprising:
transmitting a downlink control information message comprising an uplink control channel resource indicator and scheduling the multicast message; and
determining that the one or more UEs correspond to the first group of UEs based at least in part on the uplink control channel resource indicator and receiving the one or more negative acknowledgment feedback messages on the first uplink control channel resource.

21. The method of claim 18, wherein one or both of the first indication of the first uplink control channel resource or the second indication of the second uplink control channel resource are transmitted in one or both of a radio resource control message or a medium access control control element.

22. The method of claim 18, wherein the set of transmission parameters comprises one or more of a modulation and coding scheme, a pre-coding matrix, or a transmission beam.

23. An apparatus for wireless communications at a user equipment (UE), comprising:
a processor;
memory coupled with the processor; and
instructions stored in the memory and executable by the processor to cause the apparatus to:
receive an indication of a plurality of uplink control channel resources for reporting acknowledgment feedback by the UE for multicast communications, the plurality of uplink control channel resources shared by a plurality of UEs associated with the multicast communications;
receive a downlink control information message comprising an uplink control channel resource indicator and scheduling a multicast message;
determine an uplink control channel resource of the plurality of uplink control channel resources based at least in part on a set of communication conditions and the uplink control channel resource indicator, wherein the set of communication conditions comprises one or more of a received signal strength indicator, a reference signal received power, a reference signal received quality, a signal-to-noise and interference power ratio, a channel quality indicator, a pre-coding matrix indicator, a path loss, a timing advance, a power headroom, a measurement identified based at least in part on a synchronization signal block, a measurement identified based at least in part on a channel state information reference signal, or a transmitter configuration identified based at least in part on a sounding reference signal; and
transmit a negative acknowledgment feedback message for the multicast message on the determined uplink control channel resource.

24. The apparatus of claim 23, wherein the instructions to determine the uplink control channel resource further are executable by the processor to cause the apparatus to:
determine a subset of uplink control channel resources of the plurality of uplink control channel resources based at least in part on the set of communication conditions and the uplink control channel resource indicator; and
select the uplink control channel resource from the subset of uplink control channel resources based at least in part on one or more of a random selection procedure, a UE identifier, or a radio network temporary identifier.

25. The apparatus of claim 23, wherein the plurality of UEs corresponds to a plurality of UE groups and the instructions to determine the uplink control channel resource further are executable by the processor to cause the apparatus to:
determine a UE group of the plurality of UE groups comprising the UE according to the set of communication conditions, wherein the UE group corresponds to a subset of uplink control channel resources of the plurality of uplink control channel resources associated with respective uplink control channel resource indicator values; and
determine the uplink control channel resource from the subset of uplink control channel resources according to the uplink control channel resource indicator.

26. The apparatus of claim 23, wherein the instructions are further executable by the processor to cause the apparatus to detect the downlink control information message in one or more control channel elements of a control resource set, wherein the uplink channel resource is determined further based at least in part on an index of a first control channel element of the one or more control channel elements.

27. The apparatus of claim 26, wherein the uplink channel resource is determined further based at least in part on a number of control channel elements in the control resource set.

28. The apparatus of claim 23, wherein the indication of the plurality of uplink control channel resources comprises a first indication of a first plurality of uplink control channel resources, and the instructions are further executable by the processor to cause the apparatus to:
- receive a second indication of a second plurality of uplink control channel resources for reporting the acknowledgment feedback by the UE for the multicast communications, the second plurality of uplink control channel resources shared by the plurality of UEs associated with the multicast communications;
- determine to transmit the negative acknowledgment feedback message in response to one or more multicast messages comprising the multicast message; and
- select the first plurality of uplink control channel resources for reporting the acknowledgment feedback for the multicast communications based at least in part on one or both of the one or more multicast messages or a number of multicast messages in the one or more multicast messages.

* * * * *